United States Patent
Dzik et al.

(10) Patent No.: US 10,109,278 B2
(45) Date of Patent: Oct. 23, 2018

(54) ALIGNING BODY MATTER ACROSS CONTENT FORMATS

(75) Inventors: Steven C. Dzik, Somerset, NJ (US); Guy A. Story, Jr., New York, NY (US)

(73) Assignee: Audible, Inc., Newark, NJ (US)

(*) Notice: Subject to any disclaimer, the term of this patent is extended or adjusted under 35 U.S.C. 154(b) by 722 days.

(21) Appl. No.: 13/604,486

(22) Filed: Sep. 5, 2012

(65) Prior Publication Data

US 2014/0040713 A1    Feb. 6, 2014

Related U.S. Application Data

(60) Provisional application No. 61/679,015, filed on Aug. 2, 2012.

(51) Int. Cl.
- *G10L 15/26* (2006.01)
- *G06F 17/30* (2006.01)
- *G10L 15/183* (2013.01)

(52) U.S. Cl.
CPC ........ *G10L 15/26* (2013.01); *G06F 17/30056* (2013.01); *G10L 15/183* (2013.01); *H05K 999/99* (2013.01)

(58) Field of Classification Search
CPC combination set(s) only.
See application file for complete search history.

(56) References Cited

U.S. PATENT DOCUMENTS

| | | |
|---|---|---|
| 5,203,705 A | 4/1993 | Hardy et al. |
| 5,351,189 A | 9/1994 | Doi et al. |
| 5,657,426 A | 8/1997 | Waters et al. |
| 5,737,489 A | 4/1998 | Chou et al. |
| 5,978,754 A | 11/1999 | Kumano |
| 6,018,708 A | 1/2000 | Dahan et al. |

(Continued)

FOREIGN PATENT DOCUMENTS

| | | |
|---|---|---|
| CN | 1855974 A | 11/2006 |
| CN | 101651788 A | 2/2010 |

(Continued)

OTHER PUBLICATIONS

Norbert Braunschweiler, Lightly Supervised Recognition for Automatic Alignment of Large Coherent Speech Recordings, 2010, Toshiba Research Europe Ltd., Interspeech 2010, pp. 2222-2225 (Year: 2010).*

(Continued)

*Primary Examiner* — Kavita Padmanabhan
*Assistant Examiner* — Ahmad M El-Bkaily
(74) *Attorney, Agent, or Firm* — Knobbe, Martens, Olson & Bear, LLP

(57) ABSTRACT

A content alignment service is described that may generate content synchronization information to facilitate the synchronous presentation of corresponding audio content and textual content. In some embodiments, portions of body text (as opposed to front matter, such as a table of contents; or back matter, such as an index) in the textual content are identified and synchronized with corresponding audio content. In one example application, an audiobook may be synchronized with an electronic book. As the body text portions of the electronic book are consumed, corresponding words of the audiobook may be audibly presented.

21 Claims, 14 Drawing Sheets

(56) References Cited

U.S. PATENT DOCUMENTS

| | | | |
|---|---|---|---|
| 6,076,059 A * | 6/2000 | Glickman et al. | 704/260 |
| 6,088,711 A * | 7/2000 | Fein | G06F 17/211 |
| | | | 715/269 |
| 6,175,820 B1 | 1/2001 | Dietz | |
| 6,208,956 B1 | 3/2001 | Motayama | |
| 6,256,610 B1 * | 7/2001 | Baum | 704/260 |
| 6,260,011 B1 | 7/2001 | Heckerman et al. | |
| 6,263,308 B1 | 7/2001 | Heckerman et al. | |
| 6,356,922 B1 | 3/2002 | Schilit et al. | |
| 6,442,518 B1 | 8/2002 | Van Thong et al. | |
| 6,638,171 B1 | 10/2003 | Igarashi et al. | |
| 6,766,294 B2 | 7/2004 | MacGinite et al. | |
| 6,912,505 B2 | 6/2005 | Linden et al. | |
| 7,107,533 B2 | 9/2006 | Duncan et al. | |
| 7,231,351 B1 | 6/2007 | Griggs | |
| 8,106,285 B2 | 1/2012 | Gerl et al. | |
| 8,109,765 B2 | 2/2012 | Beattie et al. | |
| 8,131,545 B1 * | 3/2012 | Moreno et al. | 704/235 |
| 8,131,865 B2 | 3/2012 | Rebaud et al. | |
| 8,234,494 B1 * | 7/2012 | Bansal | G10L 17/24 |
| | | | 713/176 |
| 8,317,606 B2 | 11/2012 | Graham et al. | |
| 8,442,423 B1 | 5/2013 | Ryan et al. | |
| 8,504,906 B1 * | 8/2013 | Xu | 715/203 |
| 8,512,042 B2 | 8/2013 | Rogan et al. | |
| 8,527,272 B2 * | 9/2013 | Qin et al. | 704/254 |
| 8,548,618 B1 | 10/2013 | Story, Jr. et al. | |
| 8,572,488 B2 * | 10/2013 | Phillips | G06F 3/0482 |
| | | | 715/230 |
| 8,577,668 B2 | 11/2013 | Rosart et al. | |
| 8,798,366 B1 * | 8/2014 | Jones et al. | 382/177 |
| 8,849,676 B2 | 9/2014 | Goldstein et al. | |
| 8,855,797 B2 | 10/2014 | Story, Jr. et al. | |
| 8,861,925 B1 * | 10/2014 | Ohme | 386/207 |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 9,099,089 B2 | 8/2015 | Dzik et al. | |
| 9,280,906 B2 | 3/2016 | Arora et al. | |
| 9,317,500 B2 | 4/2016 | Hwang | |
| 9,697,265 B2 | 7/2017 | Story, Jr. et al. | |
| 9,697,871 B2 | 7/2017 | Hwang et al. | |
| 9,703,781 B2 | 7/2017 | Hwang et al. | |
| 9,706,247 B2 | 7/2017 | Anderson et al. | |
| 9,734,153 B2 | 8/2017 | Hwang et al. | |
| 9,760,920 B2 | 9/2017 | Voynow et al. | |
| 9,792,027 B2 | 10/2017 | Story, Jr. et al. | |
| 9,799,336 B2 | 10/2017 | Dzik et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0046023 A1 | 4/2002 | Fuji et al. | |
| 2002/0054073 A1 * | 5/2002 | Yuen | 345/727 |
| 2002/0116188 A1 | 8/2002 | Amir et al. | |
| 2002/0184189 A1 * | 12/2002 | Hay et al. | 707/1 |
| 2003/0023442 A1 | 1/2003 | Akabane et al. | |
| 2003/0061028 A1 | 3/2003 | Dey et al. | |
| 2003/0065503 A1 * | 4/2003 | Agnihotri | G06F 17/2705 |
| | | | 704/7 |
| 2003/0077559 A1 | 4/2003 | Braunberger et al. | |
| 2003/0083885 A1 | 5/2003 | Frimpong-Ansah | |
| 2003/0115289 A1 | 6/2003 | Chinn et al. | |
| 2004/0261093 A1 | 12/2004 | Rebaud et al. | |
| 2005/0022113 A1 * | 1/2005 | Hanlon | 715/511 |
| 2006/0148569 A1 | 7/2006 | Beck | |
| 2007/0016314 A1 | 1/2007 | Chan et al. | |
| 2007/0047003 A1 | 3/2007 | Suwabe et al. | |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0027726 A1 | 1/2008 | Hansen et al. | |
| 2008/0039163 A1 | 2/2008 | Eronen et al. | |
| 2008/0177822 A1 | 7/2008 | Yoneda | |
| 2008/0294453 A1 | 11/2008 | Baird-Smith et al. | |
| 2009/0047003 A1 | 2/2009 | Yamamoto | |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 * | 11/2009 | Hager | 704/235 |
| 2009/0281645 A1 | 11/2009 | Kitahara et al. | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0211390 A1 | 8/2010 | Hillebrecht et al. | |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0066438 A1 | 3/2011 | Lindahl et al. | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0153330 A1 * | 6/2011 | Yazdani | G10L 13/00 |
| | | | 704/260 |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 * | 9/2011 | Locker et al. | 709/203 |
| 2011/0246175 A1 | 10/2011 | Yi et al. | |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2011/0320189 A1 * | 12/2011 | Carus et al. | 704/9 |
| 2012/0030288 A1 | 2/2012 | Burckart et al. | |
| 2012/0109640 A1 | 5/2012 | Anisimovich et al. | |
| 2012/0150935 A1 | 6/2012 | Frick et al. | |
| 2012/0166180 A1 | 6/2012 | Au | |
| 2012/0197998 A1 | 8/2012 | Kessel et al. | |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1 | 9/2012 | Story, Jr. et al. | |
| 2012/0303636 A1 * | 11/2012 | Luo | G06F 17/30896 |
| | | | 707/748 |
| 2012/0310642 A1 | 12/2012 | Cao et al. | |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0103814 A1 | 4/2013 | Carrasco et al. | |
| 2013/0124984 A1 * | 5/2013 | Kuspa | H04N 9/475 |
| | | | 715/255 |
| 2013/0130216 A1 | 5/2013 | Morton et al. | |
| 2013/0212454 A1 | 8/2013 | Casey | |
| 2013/0257871 A1 | 10/2013 | Goldstein et al. | |
| 2013/0262127 A1 | 10/2013 | Goldstein et al. | |
| 2014/0005814 A1 | 1/2014 | Hwang et al. | |
| 2014/0039887 A1 * | 2/2014 | Dzik et al. | 704/235 |
| 2014/0195241 A1 * | 7/2014 | Nguyen et al. | 704/260 |
| 2014/0223272 A1 | 8/2014 | Arora et al. | |
| 2014/0250219 A1 | 9/2014 | Hwang | |
| 2015/0026577 A1 | 1/2015 | Story et al. | |
| 2015/0340038 A1 | 11/2015 | Dzik et al. | |

FOREIGN PATENT DOCUMENTS

| | | |
|---|---|---|
| CN | 103988193 A | 8/2014 |
| CN | 104662604 A | 5/2015 |
| EP | 2689342 | 1/2014 |
| EP | 2689346 | 1/2014 |
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |

(56) References Cited

FOREIGN PATENT DOCUMENTS

| | | |
|---|---|---|
| JP | 2004-117618 | 4/2004 |
| JP | 2004-266576 | 9/2004 |
| JP | 2005-189454 | 7/2005 |
| JP | 2007-522591 | 8/2007 |
| JP | 2007-249703 | 9/2007 |
| JP | 2010-250023 | 11/2010 |
| NZ | 532174 | 11/2012 |
| SG | 193537 | 10/2013 |
| SG | 193567 | 11/2013 |
| WO | WO 2006/029458 A1 | 3/2006 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

International Preliminary Report on Patentability issued in connection with International Patent Application No. PCT/US12/30198 dated Jan. 30, 2014, 8 pages.
Office Action in Japanese Application No. 2014-501257 dated Aug. 25, 2014.
International Search Report and Written Opinion in PCT/US2014/014508 dated Jun. 25, 2014.
Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.
Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.
International Search Report issued in connection with International Patent Application No. PCTUS12/30186 dated Jun. 20, 2012, 12 pages.
International Search Report and Written Opinion in PCT/US2013/042903 dated Feb. 7, 2014.
International Search Report issued in connection with International Application No. PCT/US13/53020 dated Dec. 16, 2013.
Arar, Y., Blio E-Book Platform: No Reader (Yet), But Great Graphics, Jan. 7, 2010.
Beattie, V., et al., Reading Assistant: Technology for Guided Oral Reading, Scientific Learning, Apr. 10, 2012, 5 pages.
Dzik, S.C., U.S. Appl. No. 13/604,482, filed Sep. 5, 2012, entitled Identifying Corresponding Regions of Content.
Dzik, S.C., U.S. Appl. No. 13/662,306, filed Oct. 26, 2012, entitled Content Presentation Analysis.
Hwang, D.C., et al., U.S. Appl. No. 13/536,711, filed Jun. 28, 2012, entitled Pacing Content.
International Search Report issued in connection with International Patent Application No. PCT/US12/30198 dated Jun. 20, 2012, 16 pages.

Levinson, S.E., et al., Continuous Speech Recognition from a Phonetic Transcription, Acoustics, Speech, and Signal Processing, Apr. 1990, pp. 190-199.
Vignoli, F., et al., A Text-Speech Synchronization Technique With Applications to Talking Heads, Auditory-Visual Speech Processing, ISCA Archive, Aug. 7-10, 1999.
Weber, F.V., U.S. Appl. No. 13/531,376, filed Jun. 22, 2012, entitled Modelling Expected Errors for Discriminative Training.
Extended Search Report in European Application No. 12761104.4 dated Apr. 20, 2015.
Office Action in Canadian Application No. 2830906 dated Mar. 17, 2015.
Office Action in Japanese Application No. 2014-501254 dated Oct. 14, 2014.
International Preliminary Report on Patentability in PCT/US2013/042903 dated Dec. 2, 2014.
Extended Search Report in European Application No. (12761404.8) dated Jan. 26, 2015.
International Preliminary Report issued in connection with International Application No. PCT/US13/53020 dated Feb. 12, 2015.
Office Action in Japanese Application No. 2014-501254 dated May 11, 2015.
Office Action in Canadian Application No. 2830622 dated Jun. 10, 2015.
International Preliminary Search Report on Patentability in PCT/US2014/014508 dated Aug. 4, 2015.
U.S. Appl. No. 13/070,313, Synchronizing Digital Content, filed Mar. 23, 2011.
U.S. Appl. No. 13/552,548, Synchronizing Digital Content, filed Jul. 18, 2012.
U.S. Appl. No. 13/535,240, Managing Related Digital Content, filed Jun. 27, 2012.
U.S. Appl. No. 13/535,264, Managing Related Digital Content, filed Jun. 27, 2012.
U.S. Appl. No. 13/602,012, Synchronized Digital Content Samples, filed Aug. 31, 2012.
U.S. Appl. No. 13/570,179, Synchronizing Recorded Audio Content and Companion Content, filed Aug. 8, 2012.
U.S. Appl. No. 13/070,422, Managing Playback of Synchronized Content, filed Mar. 23, 2011.
U.S. Appl. No. 13/070,421, Managing Playback of Synchronized Content, filed Mar. 23, 2011.
U.S. Appl. No. 13/070,439, Managing Playback of Synchronized Content, filed Mar. 23, 2011.
U.S. Appl. No. 13/483,883, Synchronizing Translated Digital Content, filed May 30, 2012.
U.S. Appl. No. 13/604,482, Identifying Corresponding Regions of Content, filed Sep. 5, 2012.
U.S. Appl. No. 13/758,749, Selective Synchronous Presentation, filed Feb. 4, 2013.
Office Action in Japanese Application No. 2014-501257 dated Apr. 6, 2015.
Ikura, et al., A Method of Synchronizing Voice Data With Corresponding Japanese Text Automatically, Magazine of IEICE Theses; Japan, The Institute of Electronics, Information and Communication Engineers; Feb. 1, 2006; vol. J89-D, No. 2, pp. 261-270.

* cited by examiner

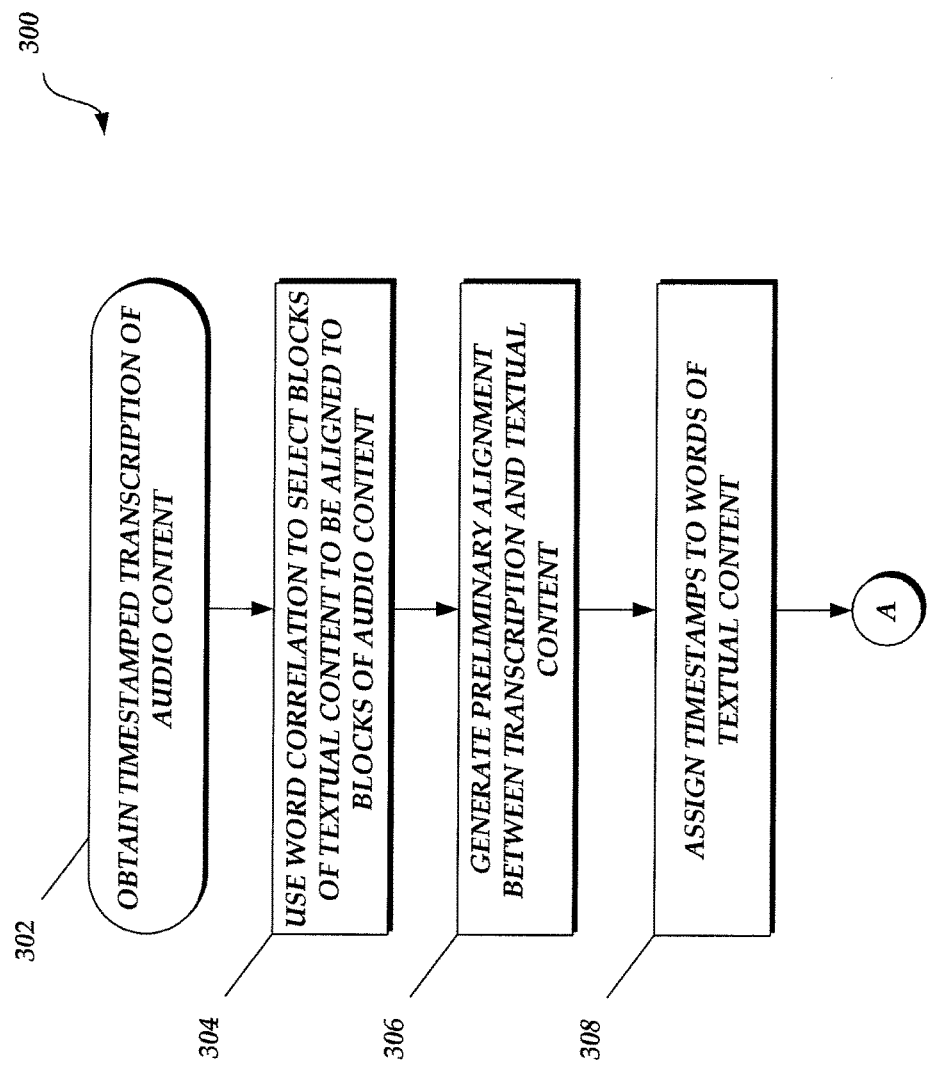

530

| | | |
|---|---|---|
| 532 — 0:04-0:06 | JUMPED | SIGNIFICANT |
| 534 ⎰ 0:06-0:08 | OVER | WEAK |
| ⎱ 0:08-0:09 | THE | WEAK |
| 536 ⎰ 0:09-0:11 | HAZY | UNCERTAIN |
| ⎱ 0:11-0:12 | FOG | UNCERTAIN |

540

| | | |
|---|---|---|
| 542 ⎰ 0:06-0:08 | OVER | WEAK |
| ⎱ 0:08-0:09 | THE | WEAK |
| 544 ⎰ 0:09-0:11 | LAZY | SIGNIFICANT |
| ⎱ 0:11-0:12 | DOG | SIGNIFICANT |

*Fig.5B.*

| TIMESTAMP | WORD | CHARACTER | SYLLABLE |
| --- | --- | --- | --- |
| 0:00-0:01 | THE | 1 | 1 |
| 0:01-0:02 | QUICK | 4 | 2 |
| 0:02-0:03 | BROWN | 9 | 3 |
| 0:03-0:04 | FOX | 14 | 4 |
| 0:04-0:06 | JUMPED | 17 | 5 |
| 0:06-0:08 | OVER | 23 | 6 |
| 0:08-0:09 | THE | 27 | 8 |
| 0:09-0:11 | LAZY | 30 | 9 |
| 0:11-0:12 | DOG | 34 | 11 |

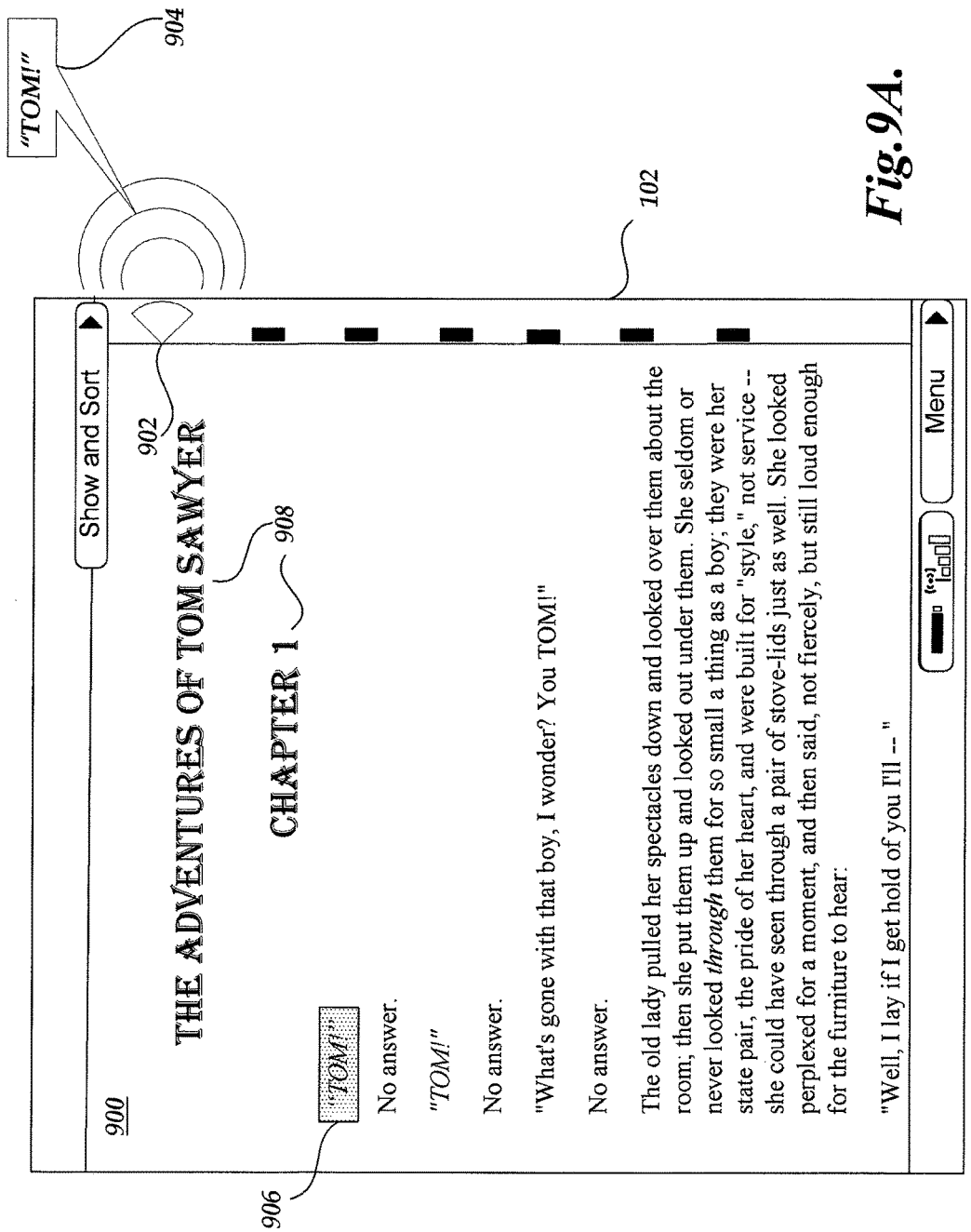

ALIGNING BODY MATTER ACROSS CONTENT FORMATS

CROSS-REFERENCE TO RELATED APPLICATION

This application claims priority under 35 U.S.C. § 119(e) to U.S. Provisional Patent Application No. 61/679,015, entitled "CONTENT ALIGNMENT" and filed on Aug. 2, 2012. The disclosure of this provisional application is hereby incorporated by reference in its entirety.

BACKGROUND

Generally described, user computing devices may facilitate the playback or display of items of content, such as audiobooks, electronic books, songs, videos, television programs, computer and video games, multi-media content, and the like. For example, an electronic book reader computing device ("e-reader") may display an electronic book on a screen and/or play an audiobook through speakers or headphones.

In some instances, a user may be interested in consuming multiple items of content at the same time. For example, a user may wish to read an electronic book while listening to an audiobook of the same title, such as *The Adventures of Tom Sawyer*. The electronic book and the audiobook (or more generally, any group of two or more items of content related to the same content title) may be referred to as "companion" items of content.

However, in many current approaches, the user must manually line up the two companion items of content so that the words narrated in the audiobook correspond to what the user is reading in the electronic book. For example, the user may find it necessary to pause the audiobook manually during portions of the electronic book that have no counterpart in the audiobook. Likewise, the user may find it necessary to manually fast-forward the audiobook during portions of the audiobook that have no counterpart in the electronic book. This scheme can prove frustrating and inconvenient for users.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 3A and FIG. 3B are flow diagrams depicting an illustrative routine for processing companion items of audio content and textual content.

FIG. 5A and FIG. 5B are table diagrams depicting an illustrative uncertain region being processed according to the flow diagrams of FIG. 4A and FIG. 4B.

FIG. 8 is a table diagram depicting illustrative metrics for measuring presentation position for a synchronous presentation of companion items of content.

FIG. 9A, FIG. 9B and FIG. 9C are pictorial diagrams of an illustrative computing device synchronously presenting companion items of content.

DETAILED DESCRIPTION

Figure 1:
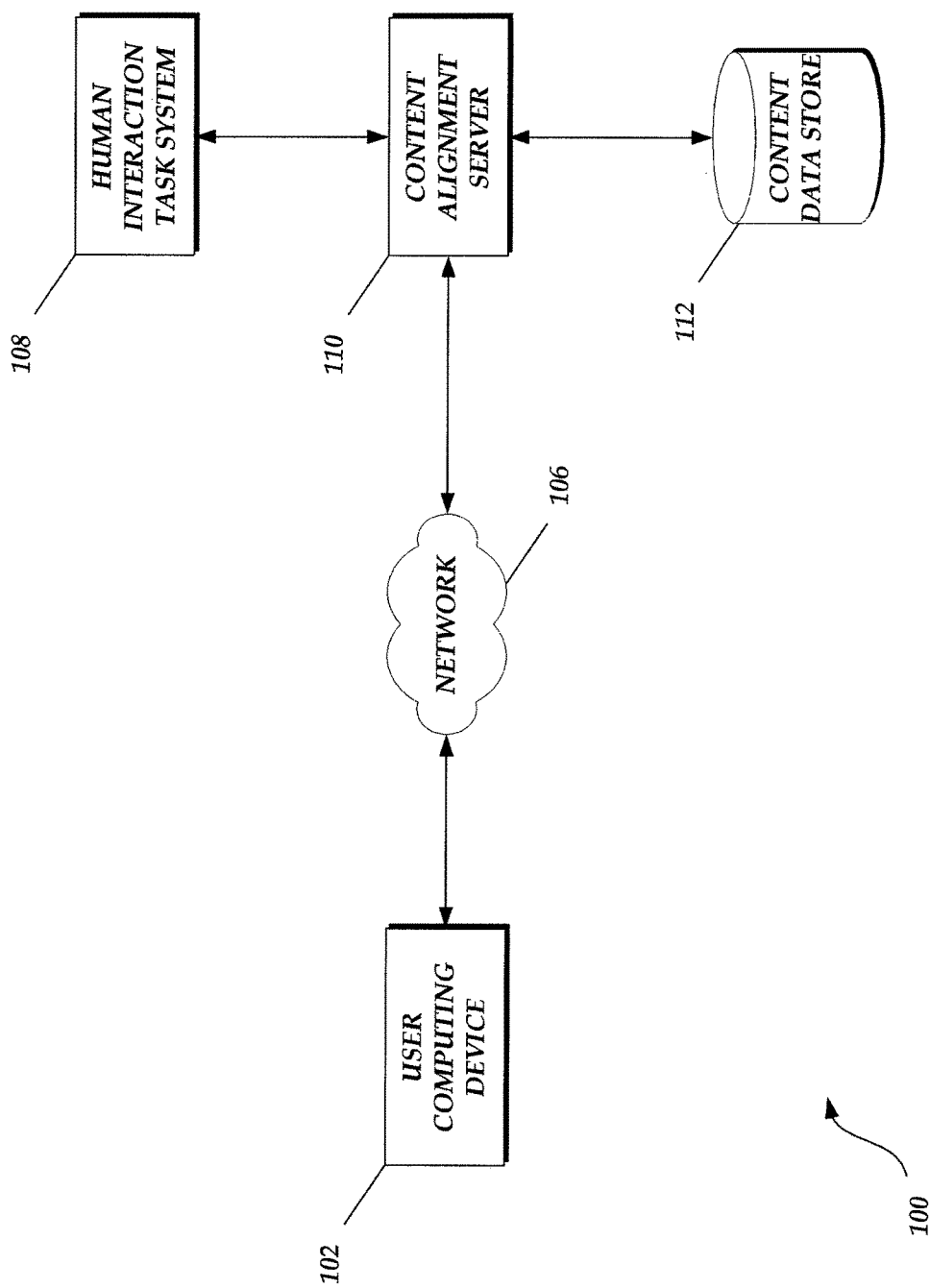
FIG. 1 is a block diagram depicting an illustrative network environment in which a content alignment service may operate.

Generally described, aspects of the present disclosure relate to facilitating the synchronous presentation of an item of content comprising audio content (such as an audiobook) with a companion item of textual content (such as an electronic book). Accordingly, a content alignment service is disclosed that may analyze items of companion content to locate portions of, e.g., the textual content, that have no counterpart in, e.g., the audio content. These mismatched portions may be referred to herein as "uncertain regions." Further processing may be performed by the content alignment service on uncertain regions to determine whether the transcription contains errors or whether the words are actually different between the audio content and the textual content. Based on the foregoing, it will be appreciated that the content alignment service may identify portions of the electronic book that do not correspond to the audiobook, such as front matter, back matter, footnotes, diagrams, tables, graphs, and the like, which are not necessarily narrated or otherwise audibly presented in audiobooks. Once identified, portions of the electronic book that do not correspond in the audiobook may be ignored (e.g., skipped over) to facilitate the synchronous presentation of the companion items of content. For example, when a user starts a new electronic book, the front matter of the electronic book can be ignored, and synchronous presentation of the electronic book and the companion audiobook can begin at the first word of the first chapter. In another example, synchronous presentation may be maintained such that a portion of the audio content is not presented while a mismatching footnote is presented. Alternately, presentation of the audiobook may stop after the last corresponding portion of the electronic book on the page is presented, and resume when a portion of the electronic book that corresponds to a portion of the audiobook is presented (e.g., after the user turns to a page in which an electronic book portion that corresponds to a portion of the audiobook is present).

In one embodiment, in order to identify uncertain regions, the content alignment service may obtain a textual transcription of an item of content comprising audio content (e.g., an audiobook) and then compare the textual transcription of the audio content to an item of content comprising textual content (e.g., an electronic book). The textual transcription may be obtained either by obtaining a pre-existing transcription or by generating one using speech-to-text recognition techniques. The transcription may include timestamps for each of the words recognized in the audio content representing a time interval during which a particular word is spoken, sung, shouted, or otherwise presented in the audio content. In addition, the textual transcription of the audio content may be divided into blocks, which may correspond to relatively large divisions of the item of content comprising audio content. For example, a block of an audiobook might correspond to one or more chapters of the audiobook, or might correspond to an interval of time in the audiobook, such as forty-five minutes or an hour.

Each block of the transcription may be aligned with a block of an item of textual content that is a companion to the item of content comprising audio content. This block-by-block alignment may be based on a correlation measure, which may measure the similarity between the blocks. A correlation measure between the block of textual content and the block of the transcription may be computed based on, for example, a percentage of words in common or the similarity of the distributions of words between the two blocks. If the correlation measure satisfies a threshold, the block of textual content may be preliminarily aligned to the block of textual content. Timestamps may be assigned to the words of the textual content in the block of textual content based on corresponding timestamped words in the transcription of the block of the audio content. This correlation measure may also be used to identify body text in the item of textual content, as front matter and back matter may be unlikely to be present in the item of audio content and thus are unlikely to be present in the transcription.

Each block of textual content may include one or more portions, such as words, phrases, sentences, paragraphs, lines of dialogue, and the like. A phrase, sentence, paragraph, or line of dialogue may include one word or more than one word. However, not all of the portions of the textual content may be present in the audio content. For example, portions of the textual content corresponding to diagrams, tables, footnotes, annotations, commentary, marginalia, front matter, back matter, and the like may be present in the block of textual content. However, such portions may not be present in the audio content. In a specific, non-limiting example, an audiobook may include narration for the body text portions of an electronic book, but may not include any narration for any footnotes in the electronic book.

Accordingly, the content alignment service may analyze the preliminarily aligned items of content to locate portions of the textual content that have no counterpart in the audio content. In one embodiment, the content alignment service compares a block of the transcription with the block of textual content with which it is preliminarily aligned on a word-by-word basis. As discussed above, each word in the transcription block may be assigned a timestamp corresponding to a time interval. Based on the assignments for the words in the transcription block, each word in the aligned textual content may be assigned a timestamp corresponding to a time interval as well. Accordingly, the content alignment service may identify any timestamped words or sequences of words in the textual content that do not correspond to the timestamped words in the transcription block in a given time interval. These non-corresponding words or sequences of words are sometimes referred to herein as "uncertain regions."

Uncertain regions may be the product of a misrecognition or mistranscription of the audio content in the transcription, or may be the product of differences between the audio content and the textual content. Further processing may be performed by the content alignment service on uncertain regions to determine whether the transcription contains errors or whether the words are actually different between the audio content and the textual content.

In one embodiment, the content alignment service may generate a language model from any words of the textual content present in the uncertain region. An interval of the audio content corresponding to the uncertain region may be converted to text using a speech-to-text routine that incorporates the language model generated from the words of the textual content. This retranscription or updated transcription of the audio content in the uncertain region may produce more word correspondences between the item of textual content and the transcription of the item of audio content. The content alignment service may attempt to identify any possible remaining corresponding words using acoustic techniques, such as by generating acoustically confusable hypotheses for any remaining words in the transcription and determining if the acoustically confusable hypothesis and timestamped word in the textual content. The content alignment service may repeat this process recursively to identify as many corresponding words as possible Based on this further processing, the content alignment service can determine which portions of the textual content (e.g. words, sentences, paragraphs, etc.) correspond to portions of the audio content, and which portions of the textual content do not correspond to the audio content. In one embodiment, the content alignment service may compare each paragraph to the transcription of the audio content with which it is aligned in time based on the correlation measure of the block to which the paragraph belongs. If the paragraph has at least a threshold percentage of corresponding words with respect to a portion of the transcription of the audio content, then the paragraph may be deemed a corresponding portion with respect to the portion of the audio content from which the portion of the transcription was generated. In some embodiments, the threshold percentage is about 50%, about 70%, or about 95%, though threshold percentages of corresponding words may be set as desired. Alternately, a portion score reflecting the frequencies of the words that are corresponding words may be generated. If the portion score satisfies a threshold, the paragraph may be deemed to correspond to a portion of the audio content.

Based on the foregoing, it will be appreciated that the content alignment service may identify portions of the electronic book that have no counterpart or match in the audiobook, such as front matter, back matter, footnotes, diagrams, tables, graphs, and the like, which are rarely narrated in audiobooks. Such portions of textual content are likely to lack any corresponding portion in the audio content, and thus would not be likely to satisfy a threshold percentage for corresponding words with respect to any portion of the audio content. Accordingly, synchronous presentation of the audio content and the textual content may be maintained by ignoring portions of textual content that do not have a corresponding portion in the audio content. Such portions of textual content may be skipped over (e.g., via an automatic page turn in an electronic book); or presentation of the audio content may pause while a mismatched portion of textual content are presented. Still other ways of maintaining synchronous presentation are possible.

To facilitate the synchronous presentation of companion items of content by a computing device, content synchronization information reflecting which portions of the textual content correspond to which portions of the audio content may be generated by the content alignment service. A computing device may obtain or generate content synchronization information, and synchronously present the textual content and the audio content according to instructions provided by the content synchronization information. These instructions may include, for example, instructions to skip over a portion of textual content that is not present in the audio content (e.g., via an automatic page turn in an electronic book), or instructions to pause or halt the presentation of the audio content while a mismatched portion of textual content are presented. Still other ways of instructing a computing device to maintain synchronous presentation are possible.

Content synchronization information can further include reference points mapping portions of the textual content to corresponding portions of the audio content. In a specific example, content synchronization information can include data that can be used to map a portion of textual content (e.g., a word, line, sentence, paragraph, etc.) to a timestamp of a corresponding item of audio content. The content synchronization information can also include information related to the relative progress of the presentation, or a state of presentation of the digital representation of the content. The synchronous presentation of the companion content can vary as a function of the capabilities and/or configuration of the device (e.g., a portable electronic book reader vs. a mobile phone) and/or the formats of the content in a companion content pair (e.g., a digital publication and an audio recording vs. a video and an audio recording). Accordingly, the content synchronization information can be generated in a variety of formats, versions, etc.

In addition, the content synchronization information can include any combination of features or data used to synchronize content. Additional features of content synchronization, such as synchronization for playback on multiple user computing devices associated with a user, are described in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are hereby incorporated by reference in their entireties.

In one example application of the content alignment service, portions of an audiobook may be compared to body text portions of an electronic book. A body text portion of the electronic book may be deemed to correspond to a portion of a transcription of the audiobook that has about 50%, about 70%, or about 95% corresponding words with respect to the body text portion. Alternately, a portion score threshold may also be set as desired; if the portion score satisfies the threshold, the portion of the audiobook from which the transcription was generated may be deemed to correspond to the portion of the electronic book. Portions of the electronic book that are not body text portions and that do not correspond to a portion in the audiobook (such as front matter, back matter, footnotes, diagrams, tables, graphs, and the like, which are rarely narrated in audiobooks) may be skipped over or ignored to facilitate synchronous presentation. Such portions of the electronic book may be skipped over (e.g., via an automatic page turn in an electronic book); or presentation of the audiobook may pause or cease while the mismatched portion of the electronic is presented.

In a specific, non-limiting example of synchronous presentation, the user may listen to the audiobook of *The Adventures of Tom Sawyer* while viewing the corresponding text of the electronic book, which text can be highlighted, underlined, or otherwise enhanced to correspond to the playback of the audiobook. The synchronous presentation experience may also include, for example, automatic page turning synchronized with audio playback and/or aligning search results in one format with a presentation position of the other format, with subsequent synchronous presentation starting at the search result position. Mismatching portions of the electronic book can be skipped or ignored by, for example, not highlighting, not underlining, or otherwise not enhancing the displayed text of the non-corresponding portion, or by automatically turning the page if all corresponding portions on the displayed page have been already highlighted, underlined, or otherwise enhanced.

It will be appreciated that the content alignment service may operate on many different types of content. Generally described, content can refer to any data that can be directly or indirectly accessed by a user, including, but not limited to audiobooks, electronic books, songs, videos, television programs, computer and video games, multi-media content, digital images, digital video, displayable text, audio data, electronic documents, computer-executable code, blocks or portions of the above, and the like. Accordingly, "item of textual content" may generally refer to any electronic item of content that includes text. Likewise, "item of audio content" may generally refer to any electronic item of content that includes audio content.

Turning to FIG. 1, an illustrative network environment 100 is shown. The network environment 100 may include a user computing device 102, a network 106, a human interaction task system 108, a content alignment server 110, and a content data store 112. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may generally be capable of presenting content to a user of the user computing device 102. For example, the user computing device 102 may be capable of playing audio content by directing audible output through speakers, headphones, or the like. The user computing device 102 may also be capable of displaying textual content, graphical content, or video content on a display screen. In some embodiments, the user computing device 102 may also be configured to present textual content and related audio or video content in a synchronized manner. The user computing device 102 may also be capable of communicating over the network 106, for example, to request content synchronization information from the content alignment server 110. In some embodiments, the user computing device 102 may include non-transitory computer-readable medium storage for storing content synchronization information and items of content, such as electronic books and audiobooks.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment to assist the content alignment server 110. Generally described, the human interaction task system 108 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content alignment service directs the human interaction task system 108 to pose one or more queries about an item of content to a human worker of the human interaction task system 108. For example, a human worker may be asked to compare a transcription of an item of audio content to an item of textual content, or to identify portion boundaries in the item of textual content, such as sentences or paragraphs. The human worker may also be asked to identify or classify front matter, back matter, footnotes, diagrams, tables, graphs, and body text in an item of textual content. The human interaction task system 108 may receive answers to these queries and transmit them to the user computing device 102 or the content alignment server 110 to guide the operation of the content alignment service. The human worker of the human interaction task system 108 may volunteer to respond to these and other tasks and to communicate other information about the item of content to the content alignment server 110.

The content alignment server 110 is a computing device that may perform a variety of tasks to implement the content alignment service. For example, the content alignment server 110 may align an item of audio content (e.g., an audiobook) and an item of textual content (e.g., an electronic book) and generate synchronization information therefrom. This synchronization information may be provided by the content alignment server 110 to a user computing device 102 over the network 106. Additional operations of the content alignment server 110 are described in further detail with respect to FIG. 2.

The content alignment server 110 may be in communication with a content data store 112. The content data store may store one or more items of content, such as items of audio content (e.g., audiobooks), items of textual content (e.g., electronic books), or other items of content. The content data store may also be configured to store synchronization information generated or obtained by the content alignment server 110. The content data store 112 may be embodied in hard disk drives, solid state memories, and/or any other type of non-transitory, computer-readable storage medium remotely or locally accessible to the content alignment server 110. The content data store 112 may also be distributed or partitioned across multiple storage devices as is known in the art without departing from the spirit and scope of the present disclosure.

The user computing device 102 and content alignment server 110 may each be embodied in a plurality of components, each executing an instance of the respective content user computing device 102 and content alignment server 110. A server or other computing system implementing the user computing device 102 and content alignment server 110 may include a network interface, memory, processing unit, and computer readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content alignment server 110. The memory generally includes RAM, ROM, and/or other persistent and/or auxiliary non-transitory computer-readable storage media.

It will be recognized that many of the devices described herein are optional and that embodiments of the environment 100 may or may not combine devices. Furthermore, devices need not be distinct or discrete. Devices may also be reorganized in the environment 100. For example, the content alignment server 110 may be represented in a single physical server or, alternatively, may be split into multiple physical servers. The entire content alignment service may be represented in a single user computing device 102 as well.

Additionally, it should be noted that in some embodiments, the content alignment service is executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
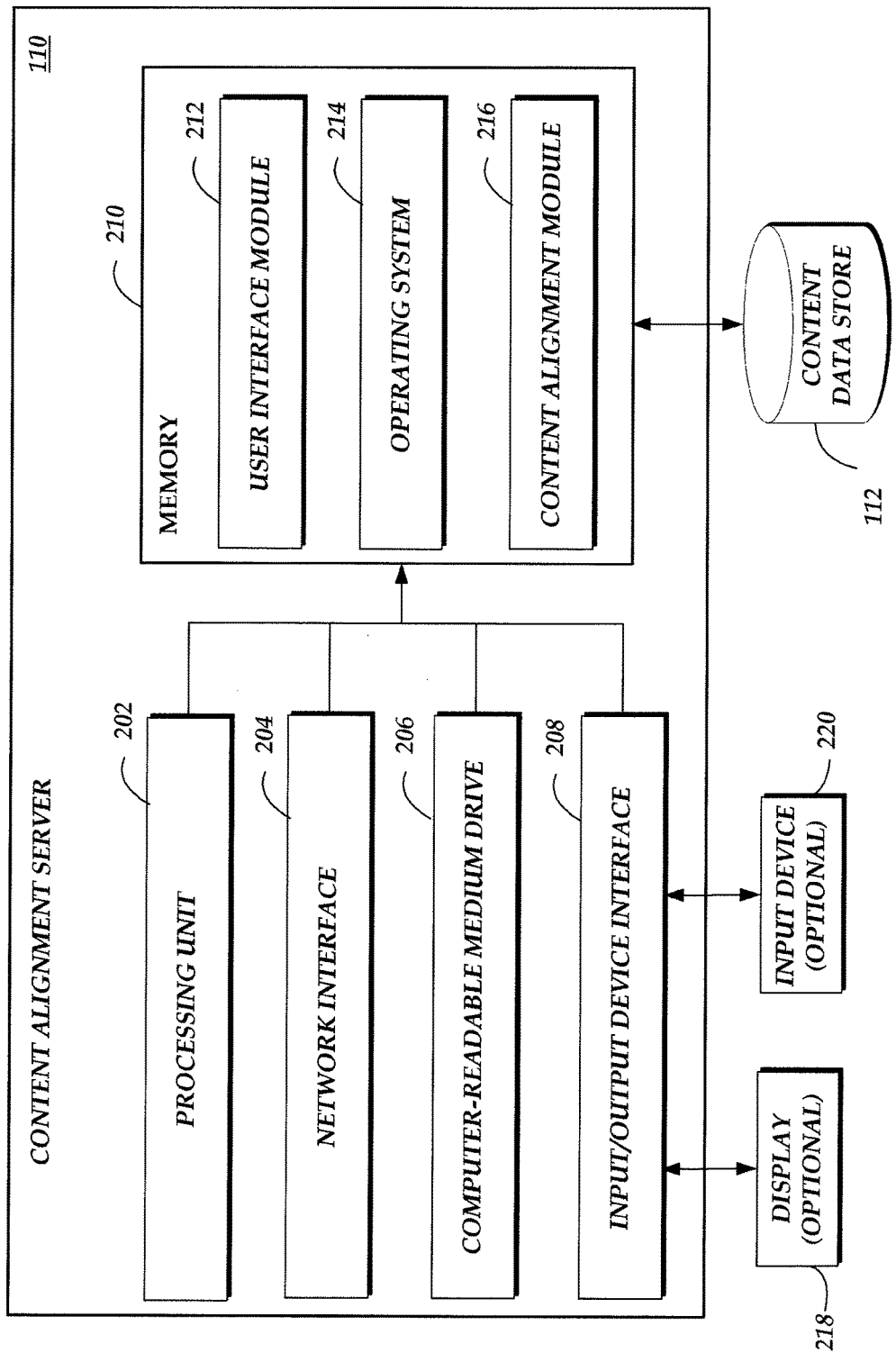
FIG. 2 is a block diagram depicting an illustrative content alignment server.

FIG. 2 is a schematic diagram of the content alignment server 110 shown in FIG. 1. The content alignment server 110 includes an arrangement of computer hardware and software components that may be used to implement the content alignment service. FIG. 2 depicts a general architecture of the content alignment server 110 illustrated in FIG. 1. Those skilled in the art will appreciate that the content alignment server 110 may include more (or fewer) components than those shown in FIG. 2. It is not necessary, however, that all of these generally conventional components be shown in order to provide an enabling disclosure.

The content alignment server 110 includes a processing unit 202, a network interface 204, a non-transitory computer-readable medium drive 206, and an input/output device interface 208, all of which may communicate with one another by way of a communication bus. As illustrated, the content alignment server 110 is optionally associated with, or in communication with, an optional display 218 and an optional input device 220. The display 218 and input device 220 may be used in embodiments in which users interact directly with the content alignment server 110, such as an integrated in-store kiosk, for example. In other embodiments, the display 218 and input device 220 may be included in a user computing device 102 shown in FIG. 1. The network interface 204 may provide the content alignment server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content alignment service. The memory 210 generally includes RAM, ROM and/or other persistent or non-transitory computer-readable storage media. The memory 210 may store an operating system 214 that provides computer program instructions for use by the processing unit 202 in the general administration and operation of the content alignment server 110. The memory 210 may further include other information for implementing aspects of the content alignment service. For example, in one embodiment, the memory 210 includes a user interface module 212 that facilitates generation of user interfaces (such as by providing instructions therefor) for display upon a computing device such as user computing device 102. The user interface may be displayed via a navigation interface such as a web browser installed on the user computing device 102. In addition, memory 210 may include or communicate with the content data store 112. Content stored in the content data store 112 may include items of textual content and items of audio content, as described in FIG. 1.

In addition to the user interface module 212, the memory 210 may include a content alignment module 216 that may be executed by the processing unit 202. In one embodiment, the content alignment module 216 may be used to implement the content alignment service, example operations of which are discussed below with respect to FIG. 3A, FIG. 3B, FIG. 4A, FIG. 4B and FIG. 6.

Those skilled in the art will recognize that in some embodiments, the content alignment service is implemented partially or entirely by the user computing device 102. Accordingly, the user computing device 102 may include a content alignment module 216 and other components that operate similarly to the components illustrated as part of the content alignment server 110, including a processing unit 202, network interface 204, non-transitory computer-readable medium drive 206, input/output interface 208, memory 210, user interface module 212, and so forth.

Figure 3B:
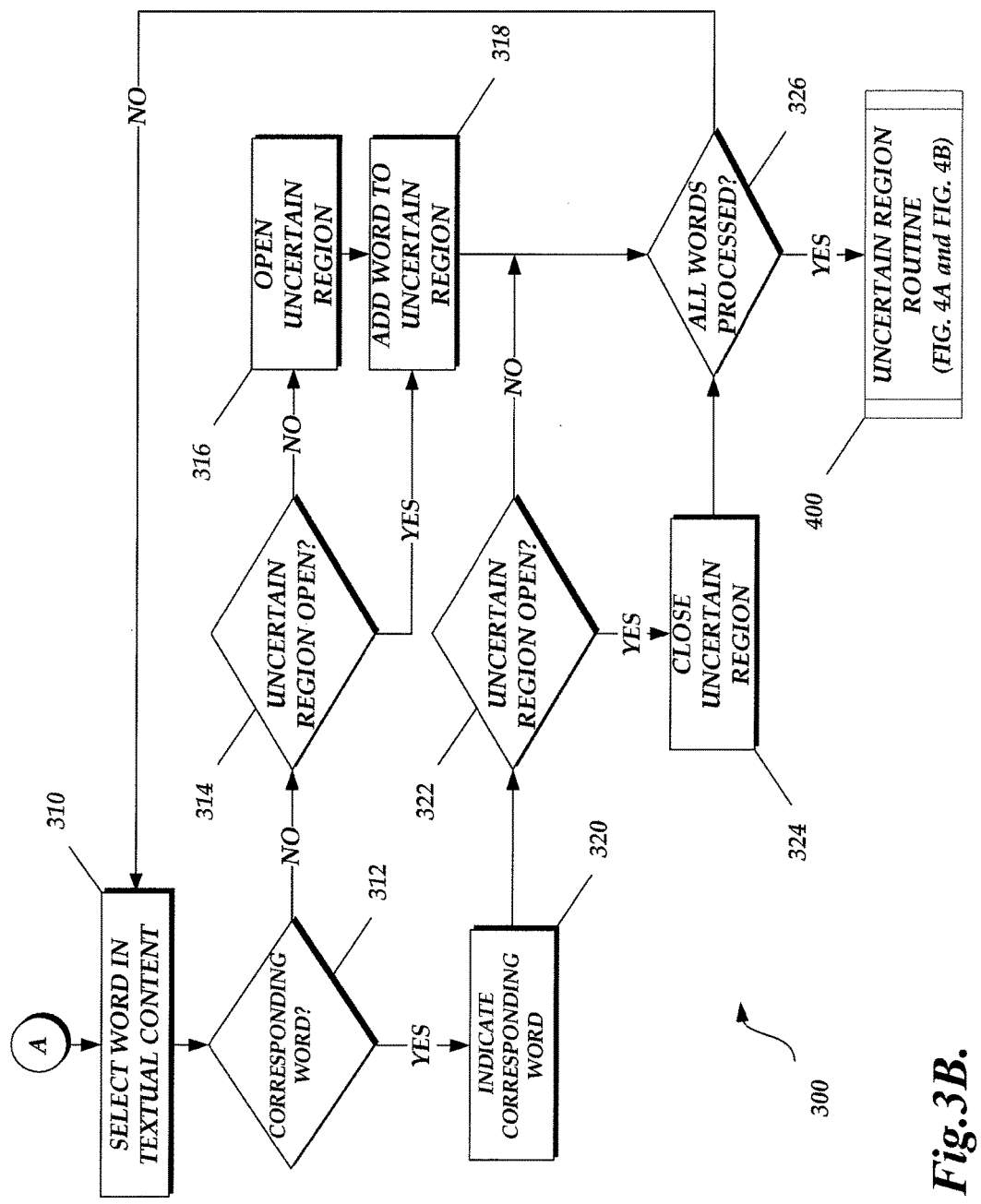

As discussed above, an item of textual content and an item of audio content may be analyzed to determine which portions of the item of textual content substantially match or correspond to portions of the item of audio content. Content synchronization information may be generated that reflects correspondences between portions of the item of audio content and portions of the item of textual content. Accordingly, FIG. 3A and FIG. 3B depict an illustrative routine 300 for identifying words in the item textual content that correspond to words in the item of audio content (e.g., words in the textual content that are audibly presented in the item of audio content). The illustrative routine 300 may be carried out by the content alignment service through, for example, execution of the content alignment module 216 by the content alignment server 110.

The illustrative routine 300 begins in block 302, in which the content alignment service may obtain a timestamped transcription of an item of audio content to be synchronously presented with a companion item of textual content. The timestamped transcription may include timestamps for each word of the transcript, corresponding to when each word is spoken (or otherwise presented audibly) in the audio content. For example, a word of the timestamped transcription might be assigned a timestamp of 0:01-0:02, indicating that the word was spoken during that time interval of the audio content. In one embodiment, the time intervals for each word are generated using known speech processing technologies, such as SOFTSOUND® speech processing technologies available from the Autonomy Corporation, which is headquartered in Cambridge, England, United Kingdom.

In one embodiment, the content alignment service transcribes the audio content using a computer-implemented speech-to-text recognition technique. In addition, a pink noise filter may be applied to the audio content as or before it is transcribed. The pink noise filter may minimize the effect of background music or other ambient noise on the transcription results, so that any words (e.g., narration of an audiobook) audibly presented (e.g., spoken) in the audio content may be more accurately recognized and transcribed. Techniques for transcribing speech to text are well known in the art and need not be discussed in further detail herein. Additionally, in other embodiments, the content alignment service may assign timestamps to a pre-existing transcription, or may obtain a pre-existing transcription that also includes timestamps.

In block 304, blocks of the textual content may be selected for preliminary alignment to blocks of the audio content. As discussed above, blocks of the audio content may correspond to, for example, one or more chapters, tracks, movements, etc. of the audio content (if the audio content includes such block divisions), or might correspond to an interval of time in the audio content, such as forty-five minutes, an hour, or any other relatively large or statistically significant interval. The transcription of the audio content may be divided into blocks corresponding to the blocks present in the audio content. The blocks of the transcription may then be compared to blocks of the textual content to identify similarities between the two. If a block of textual content is sufficiently similar to a block of transcription, the audio content from which the block of transcription was generated may be preliminarily aligned with the block of textual content.

In one embodiment, a correlation measure is used to determine which blocks of audio content should be aligned to which blocks of textual content. The correlation measure may be based at least in part on words in common between the block of textual content and a block of the transcription of the audio content. For example, the correlation measure may measure a number or percentage of words in common between the block of textual content and the block of the transcription of the audio content. The correlation measure may also measure the similarity between the probability distribution of words in the block of textual content with the probability distribution of words in the block of the transcription, such as by measuring the Kullback-Liebler distance (KLD) between the word distributions of a block of textual content and a block of the transcription. Other correlation measures may be used as desired.

If no block of the transcription can be found with which a block of the textual content has a correlation measure satisfying a threshold, the block of textual content may be removed from further consideration by the content alignment service (e.g., the content alignment service may not attempt to match any portions of the block of textual content with any portions of the item of audio content). The selection process described with respect to block 304 may be repeated sequentially until each block of the textual content has been either selected for alignment with a block of the transcription or removed from further consideration. All blocks of the textual content not removed from further consideration may be aligned with a block of the transcription (and thus, a block of the audio content) to generate a preliminary alignment of the textual content and the transcription, as shown in block 306.

It will be appreciated that any blocks of the textual content that are not preliminarily aligned to any block of the transcription are likely to represent front matter (such as tables of contents, forewords, etc.) or back matter (such as endnotes, indices, appendices, etc.), as front matter and back matter may not be represented in audio content. Accordingly, the alignment process described with respect to block 304 may be used to identify front matter and back matter in an item of textual content, as the blocks of textual content whose correlation measure exceeds a threshold are likely to include body text to the exclusion of front matter or back matter.

By identifying front matter, the content alignment service may advantageously locate a presentation position in the item of textual content at which synchronous presentation of the item of audio content may begin, as front matter is unlikely to be narrated in the item of audio content. Likewise, by identifying back matter, the content alignment service may locate a presentation position in the item of textual content at which synchronous presentation of the item of audio content may cease, as back matter is also unlikely to be narrated in the item of audio content.

Other methods of identifying front matter and back matter in an item of textual content are possible and within the scope of the present disclosure. In one embodiment, input from a human interaction task system may be obtained to identify front and back matter in an item of textual content. For example, some or all of the item of textual content may be presented to a human worker of the human interaction task system. A question may also be presented to the human worker, such as "Please identify any regions of front matter or back matter in this item of textual content." The human worker may interact with a computing device of the human interaction task system to indicate which blocks of the item of textual content are front matter or back matter, and the results may be routed to the content alignment service for use in generating a preliminary alignment. In other embodiments, front matter, back matter, or other uncertain regions are identified by metadata (such as markup), which may be provided with the item of textual content. This metadata may be provided, for example, by a publisher or author of the item of textual content, or by a user of the item of textual content. Regardless of how front and back matter is identified in the textual content, the blocks of front matter and back matter may be removed from consideration for the preliminary alignment performed by the content alignment service (e.g., the content alignment service may not attempt to match any portions of the block of textual content with any portions of the audiobook).

With continued reference to FIG. 3A, once the preliminary alignment of the textual content and the transcription of audio content is generated in block 306, timestamps may be assigned to words of the textual content in block 308. Timestamps may be assigned to words of textual content in any of a number of ways, non-limiting examples of which are described below.

In some embodiments, the timestamps of the words in a block of the transcription of the audio content are used to assign timestamps to words in the preliminarily aligned block of textual content. The timestamp assigned to a word in the block of textual content may represent a prediction or hypothesis that the word is audibly presented in the audio content during the time interval specified by the timestamp. This prediction or hypothesis may be based at least in part on the timestamps assigned to the words in the transcription. In one embodiment, timestamps are assigned to words of the block of textual content in this way by using SOFTSOUND® speech processing technologies developed by the Autonomy Corporation, substantially as discussed above.

In still other embodiments, timestamps are assigned to words of a block of textual content without necessarily referring to the block of the timestamped transcription. Accordingly, time heuristics that can determine a timestamp for a word of the textual content may be used. In one embodiment, the timestamp for a word of the textual content is estimated based at least in part on the number of letters of the word of the textual content. In another embodiment the timestamp for a word of the textual content is estimated based at least in part on the number of syllables of the word of the textual content. For example, the first word of the block of textual content may be assigned a timestamp that corresponds to the beginning of the block of textual content (e.g., from 0:00-0:01 seconds). The second word of the block of textual content may be assigned a timestamp that starts at the end of the first word and continues for the length of the second word (e.g., from 0:01-0:02 seconds).

In still other embodiments, timestamps are assigned to words of a block of textual content on a sequential basis. Generally described, the words of the timestamped transcription and the words of the block of textual content may be assigned to sequential numbers. Based on the timestamp of a word of the timestamped transcription, a sequentially corresponding word of the block of textual content may be assigned a substantially similar timestamp. An example will be illustrative. A first word of the block of the timestamped transcription may be assigned a timestamp of 0:00-0:01 seconds. Accordingly, the first word of the block of textual content may be assigned a timestamp of 0:00-0:01 seconds. A second word of the block of the timestamped transcription may be assigned a timestamp of 0:01-0:02 seconds. Accordingly, the second word of the block of textual content may be assigned a timestamp of 0:01-0:02 seconds.

Once timestamps have been assigned to words in the textual content, the illustrative routine 300 continues in block 310 in FIG. 3B where a word of the textual content having an assigned timestamp may be selected in block 310. Next, in block 312, the content alignment service may determine whether the selected word in the textual content corresponds to a word in the transcription of the item of audio content. In some embodiments, a word in the textual content corresponds to a word in the transcription of the item of audio content if the word is a word and time match with respect to a word in the transcription of the audio content. Generally described, a word and time match reflects that the selected word in the textual content has a similar or identical timestamp or sequential position (or otherwise chronologically corresponds or sequentially corresponds) to a substantially matching word in the transcription of the audio content.

As an illustrative example of a corresponding word, the word "tiger" may be spoken during the time interval 0:01-0:03 (seconds) in a block of audio content, and the transcription of the word "tiger" may include a timestamp indicating that "tiger" was spoken during the time interval 0:01-0:03. The block of textual content may also contain the word "tiger," and the content alignment service may assign a timestamp to the word "tiger" corresponding to a 0:01-0:03 time interval in the block of textual content, based on one or more of the ways to assign timestamps to words in an item of textual content discussed above. Accordingly, because the word "tiger" appears in both the textual content and the transcription during the same time interval, the word "tiger" may be determined to be a corresponding word.

In some embodiments, a corresponding word may be found if time intervals overlap, or if one time interval contains another. Returning to the above example, the word "tiger" may be spoken during the time interval 0:01-0:03 (seconds) in a block of audio content, and the transcription of the block of audio content may accordingly have a timestamp indicating that "tiger" is spoken during the time interval 0:01-0:03. The block of textual content may also contain the word "tiger," and the content alignment service may assign the word "tiger" a timestamp corresponding to the 0:01-0:04 time interval in the block of textual content, based on one or more of the ways to assign timestamps to words in an item of textual content discussed above. "Tiger" may thus be deemed a corresponding word in the item of textual content and the item of audio content, as the interval for "tiger" in the audio content (0:01-0:03) falls within the interval assigned to "tiger" in the textual content (0:01-0:04).

Alternately, the content alignment service may assign a timestamp to the word "tiger" that corresponds to the 0:02-0:04 time interval in the block of textual content, based on one or more of the ways to assign timestamps to words in an item of textual content discussed above. This too may be deemed a corresponding word, as the interval for "tiger" in the audio content (0:01-0:03) overlaps in part with the interval assigned to "tiger" in the textual content (0:02-0:04).

As discussed above, an uncertain region may represent a sequence of one or more words in the textual content that do not correspond to the timestamped words in the transcription block for a given time interval. Accordingly, if the word of the textual content selected in block 310 does not correspond to a word of the transcription as determined in block 312, then the selected word is considered part of an uncertain region of the textual content and the illustrative routine determines in block 314 whether the uncertain region is "open." An uncertain region is "open" if a word of the textual content immediately prior to the word selected in block 310 has been identified as a non-corresponding word or mismatch. If the uncertain region is not open, the content alignment service opens a region in block 316. When an uncertain region is opened, the word that prompted the uncertain region to be opened may be identified as the first word of a sequence of words corresponding to the uncertain region. If the uncertain region is already open, the word may be added in sequence to the uncertain region as shown in block 318. The words included in an uncertain region may be stored in memory for further processing by the uncertain region routine 400 discussed below.

If the word of the textual content selected in block 310 is corresponds to a word of the transcription as determined in block 312, the illustrative routine 300 may indicate that the words correspond in block 320. This correspondence may be stored in memory for future processing by the content synchronization routine depicted in FIG. 6, discussed further below. If an uncertain region is open as indicated by decision block 322, the uncertain region may be closed in block 324. In some embodiments, when an uncertain region is closed, no new words are added to the previously-opened, now-closed uncertain region, with the next uncertain word prompting a new uncertain region to be opened. The opening and closing of uncertain regions generally reflects that uncertain regions may be bounded by corresponding words.

In block 326, the content alignment service determines whether all words in the item of textual content (or in a block of textual content) have been processed as discussed above with respect to blocks 310 to 326. If there are words in the textual content remaining to be processed, the illustrative routine may return to block 310 and select another word in the textual content. If all words have been processed, the uncertain regions to which the mismatched words have been added may be processed by an uncertain region routine 400 discussed further with respect to FIG. 4A and FIG. 4B.

In some embodiments, the segment of the illustrative routine 300 shown in FIG. 3B may be performed sequentially for each word of an item of textual content, e.g., starting from the first word of the item of textual content, then proceeding to the second word, third word, fourth word, and so on. However, it should be appreciated that any discussion of sequential word-by-word comparisons (e.g. in blocks 310 and 312) are for illustrative purposes only and are not intended to limit the scope of the present disclosure. Words in the item of textual content need not be selected for processing in any particular order.

Figure 4A:
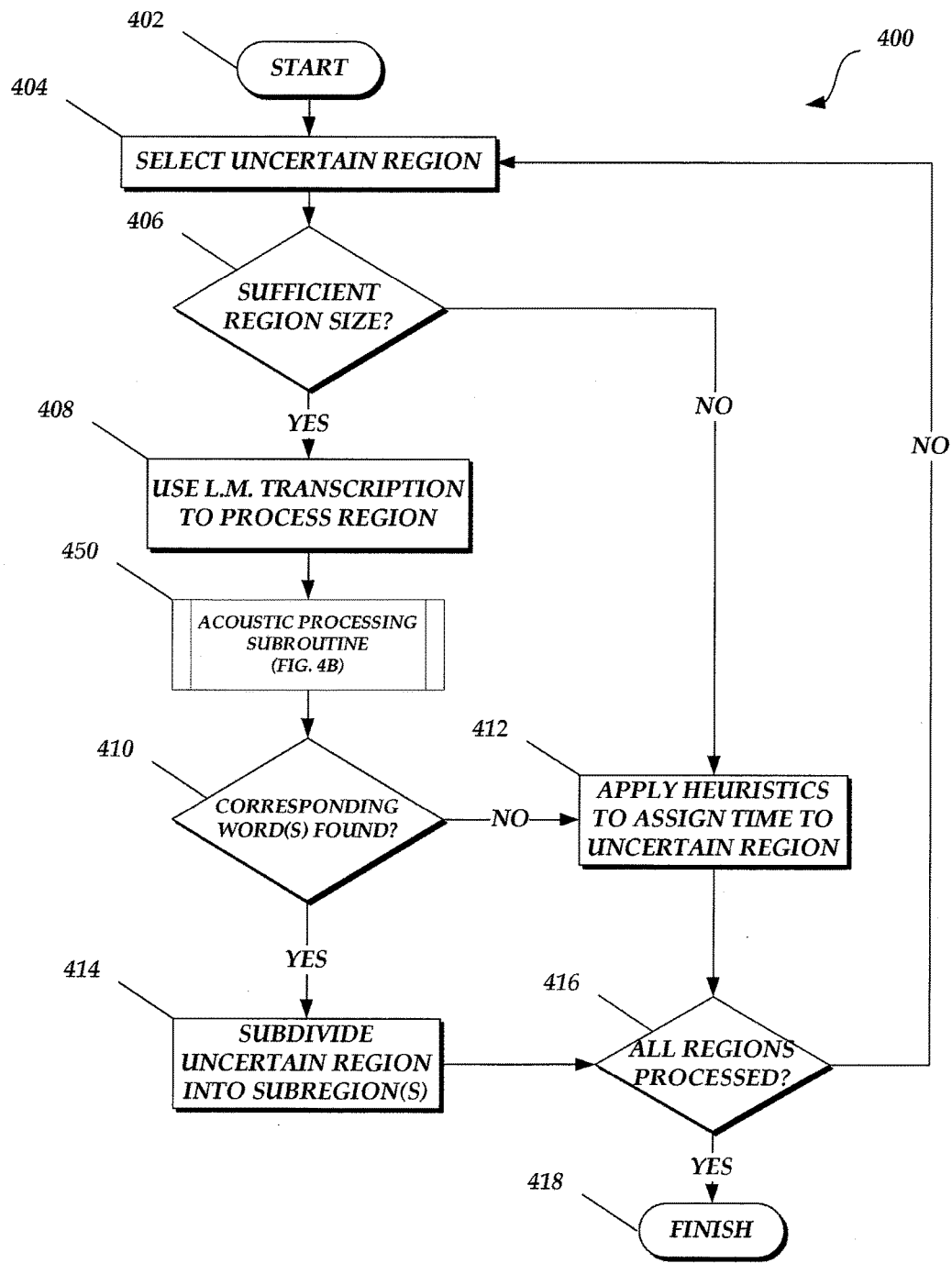
FIG. 4A and FIG. 4B are flow diagrams depicting an illustrative routine for processing uncertain regions of textual content, e.g., regions of textual content that may not have a counterpart in a companion item of audio content.

Turning to FIG. 4A, an uncertain region routine 400 is shown. As discussed above, an uncertain region may represent a sequence of one or more timestamped words in the textual content that do not correspond to the timestamped words in the transcription block of the audio content. The uncertain region routine 400 may help the content alignment service determine whether an uncertain region is the product of a misrecognition or mistranscription of the audio content in the transcription, or whether the uncertain region is the product of differences between the audio content and the textual content.

The uncertain region routine 400 may start in block 402. In block 404, an uncertain region as identified in the routine 300 shown in FIG. 3A and FIG. 3B may be selected for processing. In embodiments in which the uncertain region routine 400 operates iteratively, an uncertain subregion that has been subdivided from an uncertain region may also be selected for processing in block 404. Subdividing uncertain regions is discussed in greater detail below with respect to block 414.

In block 406, the content alignment service determines whether the uncertain region or subregion to be processed has a number of words that satisfies a threshold number of words. As small mismatches between the textual content and the audio content may only slightly interrupt the user experience of synchronous presentation, in some embodiments, the content alignment service only fully processes uncertain regions that have at least a threshold number of words, such as at least one word, at least five words, at least ten words, or any other threshold number of words. Uncertain regions or subregions that do not include at least a threshold number of words may simply have times assigned to them based on heuristics as shown in block 412 and as further discussed below. Advantageously, this approach may conserve the computational resources of a computer system implementing aspects of the content alignment service, and may also reduce the time that it takes to implement aspects of the content alignment service.

If the uncertain region or subregion does include a threshold number of words, the illustrative routine 400 proceeds to block 408. In block 408, a language model may be generated from the word or words of the textual content in the uncertain region or subregion and used to generate an updated transcription or retranscription of a region of the audio content that corresponds to the uncertain region or subregion in the textual content. In some embodiments, the correspondence between the region of the audio content and the uncertain region is a chronological or sequential correspondence, based on the timestamps or sequential position assigned to the words of the uncertain region in FIG. 3A. The content alignment service may additionally identify any new corresponding words identified in the retranscription or updated transcription in block 408.

Generally described, a language model represents the probability that a word or sequence of words appears in a particular corpus of training text. In some embodiments, the language model is based at least in part on the word or words in the uncertain region or subregion (e.g., the uncertain region or subregion may serve as the corpus of training text). Techniques for generating language models from training text are well-known in the art and need not be discussed further herein. The probabilities present in a language model can be used to identify acoustic inputs with the use of a speech recognizer. For example, a speech recognizer may receive an acoustic input that may correspond to two or more possible words or word sequences. The language model may be used to determine the probabilities of each of the words or word sequences that correspond to the acoustic input, and the acoustic input may be recognized as being the word sequence with the highest probability.

The language model may be used to retranscribe or update the transcription of the audio content. This retranscription or updating may cause some words in the audio content that were previously recognized incorrectly by the speech recognizer as a mismatch to be recognized correctly as corresponding to a word of the textual content. For example, the original transcription of a block of audio content may have indicated that the word "buyer" was spoken during the 0:01-0:04 time interval. The block of textual content may contain the word "tiger," and the content alignment service may assign the word "tiger" a timestamp corresponding to the 0:01-0:04 time interval in the block of textual content based on one or more of the ways to assign timestamps to words in an item of textual content discussed above. As "buyer" and "tiger" are different words, they would not be identified as corresponding words based on the original transcription. However, in the updated textual transcription, "tiger" may instead be recognized during the 0:01-0:04 time interval, as the language model may be more likely to cause the speech recognizer to recognize an acoustic input as a word of the uncertain region. Accordingly, words that were initially incorrectly recognized as mismatches may be correctly identified as corresponding words based on the updated textual transcription.

In some embodiments, the words that appear in the updated textual transcription are assigned scores. A weak (or lower-scoring) corresponding word may reflect that while the words correspond, the word is nonetheless relatively common, and thus provides relatively little information regarding any differences or similarities between the audio content and the textual content. Relatively common words may include words such as prepositions, articles, pronouns, auxiliary verbs, and the like. A table of relatively common words may be maintained for various languages in which items of textual content may be written as well. A relatively uncommon or statistically improbable word (sometimes referred to herein as a "significant" word) present that appears in the item of textual content and has a corresponding word in the item of audio content may provide relatively more information regarding similarities between the audio content and the textual content.

The score of a corresponding word may be measured in several ways. In one embodiment, a corresponding word is scored according to how frequently the corresponding word appears in the item of textual content. In another embodiment, a corresponding word is scored according to how frequently the letters that constitute the corresponding word appear in the language of the item of textual content. For example, the word "xylophone" may be given a relatively high score, as "xylophone" uses relatively uncommon English letters such as "x," "y," and "h." An example measure for how frequently letters appear in a language is provided by the scores assigned to the letters of the alphabet in the board game SCRABBLE®, produced by Hasbro Corporation, which is headquartered in Pawtucket, R.I., United States. In still another embodiment, the word score for a corresponding word is based at least in part on a number of syllables of the corresponding word. Still other ways for determining a corresponding word score are possible.

Figure 4B:
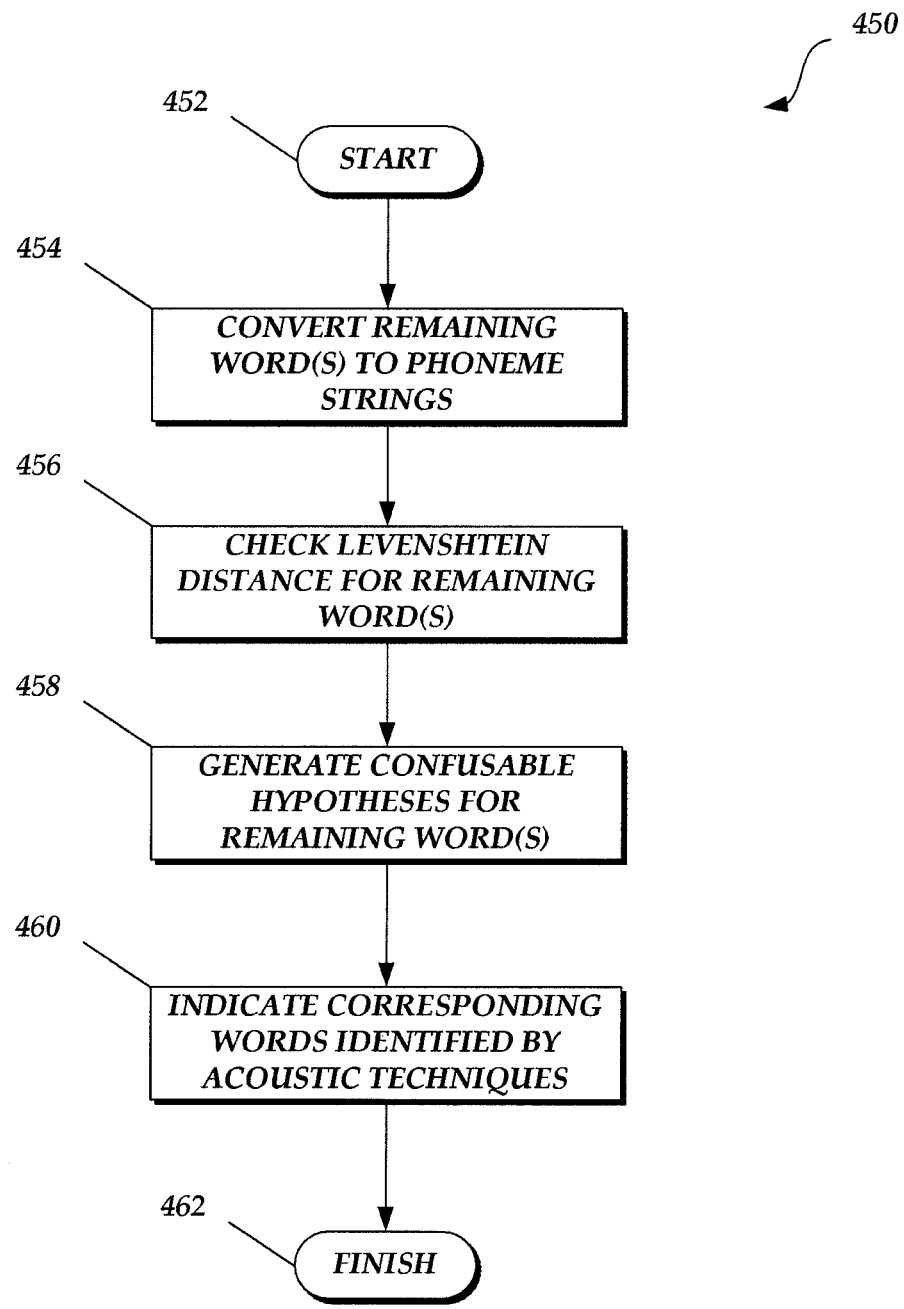

Remaining unmatched words in the uncertain region may be processed using an acoustic processing subroutine 450, as shown in FIG. 4B. The updated textual transcription may be further updated with acoustic techniques to process remaining non-corresponding words of the uncertain region. Turning to FIG. 4B, the acoustic processing subroutine 450 begins in block 452. In block 454, a string of one or more non-corresponding timestamped words in the updated textual transcription of the audio content and a string of one or more non-corresponding timestamped words in the textual content that have overlapping or identical timestamps are converted to phoneme strings. By converting the words to phoneme strings, the content alignment service may use acoustic techniques to identify possible corresponding words.

In block 456, the Levenshtein distance between a phoneme string generated from a string of one or more words of the textual content and a phoneme string generated from a string one or more words in the updated transcription that occur during a substantially overlapping or identical timestamp may be computed. If the Levenshtein distance between the two phoneme strings satisfies a threshold, the phoneme strings (and thus the one or more words in the updated transcription and the item of textual content) may be deemed to correspond.

In block 458, acoustically confusable hypotheses may be generated based on any unmatched words in the transcription or in the updated textual transcription. If an unmatched word of the transcription or updated textual transcription shares a time interval with a word in the textual content, and an acoustically confusable hypothesis of the word of the transcription or updated textual transcription is substantially similar to the word in the textual content, then the word in the textual content and the word in the update textual transcription may be deemed to correspond. An example technique for generating acoustically confusable hypotheses for a word or word sequence is disclosed in U.S. patent application Ser. No. 13/531,376, entitled "MODELLING EXPECTED ERRORS FOR DISCRIMINATIVE TRAINING" and filed on Jun. 22, 2012. The disclosure of this application is hereby incorporated by reference in its entirety.

In block 460, the content alignment service may identify any corresponding words produced by either or both of the acoustic techniques, and mark such words accordingly. These corresponding words may be assigned scores as well, substantially as described above with respect to block 408 in FIG. 4A.

Returning to FIG. 4A, in block 410, the content alignment service may determine whether any corresponding words have been identified either in block 408 or in the acoustic processing subroutine 450. If no corresponding words were identified, heuristics may be applied to assign a time to the uncertain region in block 412. Generally described, these heuristics may be used to estimate a time interval over which the item of audio content and the item of textual content will not correspond. This time interval may be estimated in a number of ways. In one embodiment, the time interval is estimated based at least in part on the number of non-corresponding words in the uncertain region. In another embodiment, the time interval is estimated based at least in part on the number of syllables of the non-corresponding words in the uncertain region. In still another embodiment, the time interval is estimated based at least in part on the number of letters of the non-corresponding words in the uncertain region. Still other heuristics for estimating the time interval for the non-corresponding words in the uncertain region are possible. Advantageously, this time interval may be used to facilitate synchronous presentation of the item of content and the item of audio content by indicating a time interval over which the audio content may not necessarily correspond to the textual content. Synchronous presentation of the item of audio content and the item of textual content may be started, stopped and restarted accordingly.

If at least one corresponding word was identified in decision block 410, the uncertain region may be divided into uncertain subregions in block 414. These subregions may be bounded by significant corresponding words. A significant corresponding word may be a word that has a word score satisfying a threshold and that is also a word and time match between the item of textual content and at least one of the textual transcription and the updated textual transcription. These subregions may include one or more words that are mismatches between the item of textual content and the updated transcription of the item of audio content. These subregions may also (or instead) include one or more weak corresponding words (e.g., words with a word score that does not satisfy a threshold, which may represent short and/or common words such as articles, prepositions, pronouns, auxiliary verbs, and the like).

In block 416, the content alignment service may determine whether all uncertain regions and subregions either have been assigned times based on the heuristics as in block 412 or have been subdivided as in block 414. If not, another uncertain region may be selected for processing in block 404. If all uncertain regions have been processed, the uncertain region routine 400 may finish in block 418.

As discussed above, in some embodiments, the uncertain region routine 400 is implemented iteratively. Accordingly, a subregion identified in block 414 may be selected in block 404 for processing. In some of these embodiments, the language model transcription in block 408 does not occur if a subregion is selected for processing in 404. This approach may conserve computational resources and/or reduce the time taken to implement aspects of the content alignment, as the language model transcription performed in block 408 may be relatively computationally expensive. It will be further recognized that a subregion selected for processing in block 404 may be further subdivided into sub-subregions, etc. in block 414. This iterative approach may continue until all regions, subregions, etc. have been processed, such that each word has been either identified as a corresponding word (either by the language model transcription or the acoustic techniques) or assigned a time by the heuristics in block 412.

Figure 5A:
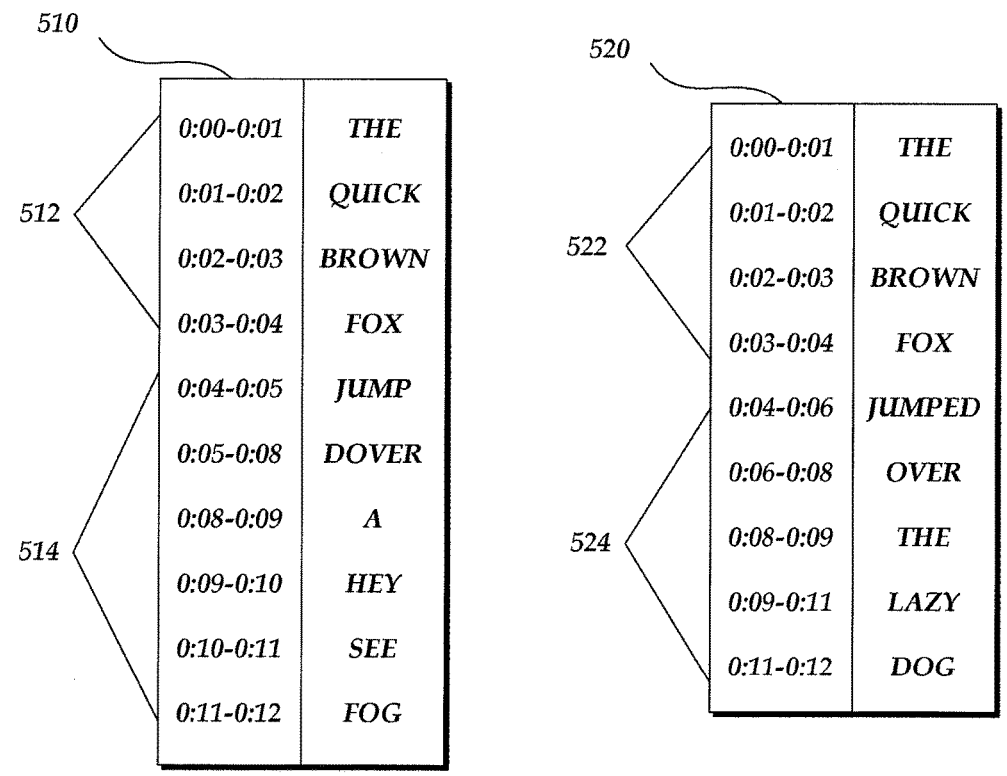

Turning now to FIG. 5A, an illustrative operation of the routines shown in FIG. 3A, FIG. 3B, FIG. 4A, and FIG. 4B is depicted. As discussed above, it may be unclear as to whether an uncertain region is the product of a mistranscription of the audio content, or whether the textual content is different from the audio content that was transcribed. For example, the uncertain region may be part of the front matter of the item of textual content (e.g., a table of contents or foreword), or may be part of the back matter of the item of textual content (e.g., an index or appendix). The uncertain region may also be part of a footnote, diagram, table, graph, etc. Nonetheless, a block of the textual content to which the uncertain region belongs may have enough words in common with a transcription of a block of audio content that a preliminary alignment between the two may have been made based on a correlation measure, as discussed above with respect to block 304 of FIG. 3A.

The transcription table 510 may represent a region of a first transcription of audio content that is a companion to an item of textual content. Each word in the region may have a timestamp, as discussed above with respect to block 302 of FIG. 3A. The textual content table 520 may represent the timestamps assigned to the words of a corresponding region of the textual content, which timestamps may be based on the timestamps assigned to the audio content, as discussed above with respect to block 308 of FIG. 3A. For example, a block of audio from which the words in table 510 were transcribed may have been aligned with a block of textual content to which the words of block 520 belong, substantially as discussed above with respect to blocks 304 and 306 of FIG. 3A.

As shown in FIG. 5A, the words "the quick brown fox" are present in both the transcription table 510 and the textual content table 520. "The quick brown fox" also occurs at the same time in both the transcription table 510 and the text table 520. Accordingly, the words in the region 512 in the transcription table 510 and the region 522 in the textual content table 520 may be deemed corresponding words. These corresponding words would be part of an uncertain region.

However, as shown in the transcription table 510, not all of the words in the transcription correspond to the words in the textual content. The words indicated by the region 514 of the transcription, for example, are mismatched with respect to the words in the region 524 of the textual content. Accordingly, the region 524 may be deemed an uncertain region, which may be processed as described above with respect to the uncertain region routine 400 described above. The uncertain region 524 contains several words that do not correspond to the words with similar timestamps as indicated by the region 514 of the transcription.

As discussed above, an updated textual transcription of the audio content may be generated based on a language model generated from one or more words of the uncertain region 524. Turning to FIG. 5B, the updated textual transcription table 530 shows a hypothetical updated textual transcription of the audio content using a language model that is based at least in part on the uncertain region 524. As discussed above, a language model may improve the probability that words in the audio content that actually correspond to words in the textual content are correctly recognized as such. Here, for example, the words "jumped over" appear in the uncertain region 524, and accordingly would appear in the language model. The words originally recognized in the audio content as "jump Dover" may instead be recognized using the language model as "jumped over," as "jumped over" is assigned a higher probability in the language model than "jump Dover." Likewise, the word "the" might appear in the language model, as it appears in the uncertain region 524 of the textual content, while the word "a" does not appear in the uncertain region. Accordingly, a word of the audio content originally misrecognized as "a" may be correctly recognized as "the" using the language model, which may assigned a higher probability to the word "the."

As discussed above, in some embodiments, corresponding words may be assigned scores. A corresponding word may be considered significant if the corresponding word has a word score satisfying a threshold. Here, the word "jumped" may be considered a significant corresponding word 532, as it may have a word score that satisfies the threshold word score. By contrast, while the words "over the" in the updated textual transcription table 530 may correspond to the words "over the" in the textual content table 520, these words may be considered weakly corresponding words 534, as they may not have word scores that satisfy a word score threshold (owing to "over" and "the" being short, common words, for example).

Additionally, the updated textual transcription may also cause words that were initially misrecognized to continue to be misrecognized in the updated textual transcription; here, the words "hazy fog" in the updated textual transcription indicated by mismatched text string 536. However, "hazy fog" may have a higher probability in the language model than "hey see fog," (as "hazy fog" may appear more frequently in the English language than "hey see fog") and so "hazy fog" may be recognized in the updated textual transcription instead of "hey see fog."

While the words "jumped over the" in the strings 532 and 534 of the updated textual transcription table 530 are corresponding words (e.g., are word and time matches to the item of textual content), a mismatched string 536 remains in the updated textual transcription. As shown in updated textual transcription table 530, the words "hazy fog" in the updated textual transcription form a string 536 that does not include any words that correspond to words of the textual content, which includes the words "lazy dog" for the time interval 0:09-0:12. To process remaining unmatched words, the content alignment service may use acoustic techniques, substantially as discussed above with respect to FIG. 4B.

Acoustic techniques may be used to process any remaining unmatched words of either the transcription or the updated textual transcription. For example, the Levenshtein distance between phoneme strings generated from any mismatched words in the textual content and in the transcription or updated textual transcription may be generated. Words in the same interval whose phoneme strings have a Levenshtein distance satisfying a threshold may be deemed corresponding words. Acoustically confusable hypotheses may also be used to attempt to identify any corresponding words.

The table 540 shows a hypothetical significant corresponding region 544 identified using acoustic techniques. For example, "hazy fog" may be an acoustically confusable hypothesis for "lazy dog," and thus, the words of the audio content may be deemed to correspond to "lazy dog" in the textual content. Alternately, "hazy fog" may have a relatively low phoneme-string Levenshtein distance with respect to "lazy dog," and thus the words of the audio content may be deemed to correspond to "lazy dog" in the textual content. As the words "lazy dog" is relatively uncommon, they may have a word score satisfying a threshold, making the words "lazy" and "dog" significant corresponding words. The words "over the" in the weakly corresponding string 542 may be selected as a subregion for further processing as discussed above with respect to FIG. 4A, or may have times assigned to them by heuristics as also discussed above with respect to FIG. 4A. Were any remaining mismatched words present in the table 540, they may have been identified as a subregion and selected in block 404 of FIG. 4A for reprocessing as well.

It will be recognized that the techniques used to identify corresponding words (e.g., words that are word and time matches in the item of textual content and the transcription of the item of audio content) may be reordered as desired. For illustrative purposes, the illustrative uncertain region processing routine 400 uses a language model to generate an updated transcription of the audio content, then uses acoustic process based on the transcription updated with the language model. However, it will be recognized that the acoustic processes described herein may be employed before or concurrently with the language model processing techniques discussed herein.

The uncertain region processing discussed above may be used to more precisely determine which portions of the textual content match or correspond to which portions of the audio content. The uncertain region processing may determine whether the differences in the transcription and the textual content are the product of a misrecognition of the words in the audio content or the product of actual differences between the words of the audio content and the words of the textual content. Differences in the transcription and the textual content are the product of an actual difference between the words of the audio content and the words of the textual content may be advantageously identified with greater precision so as to facilitate the synchronous presentation of corresponding or matching portions of audio and textual content.

Figure 6:
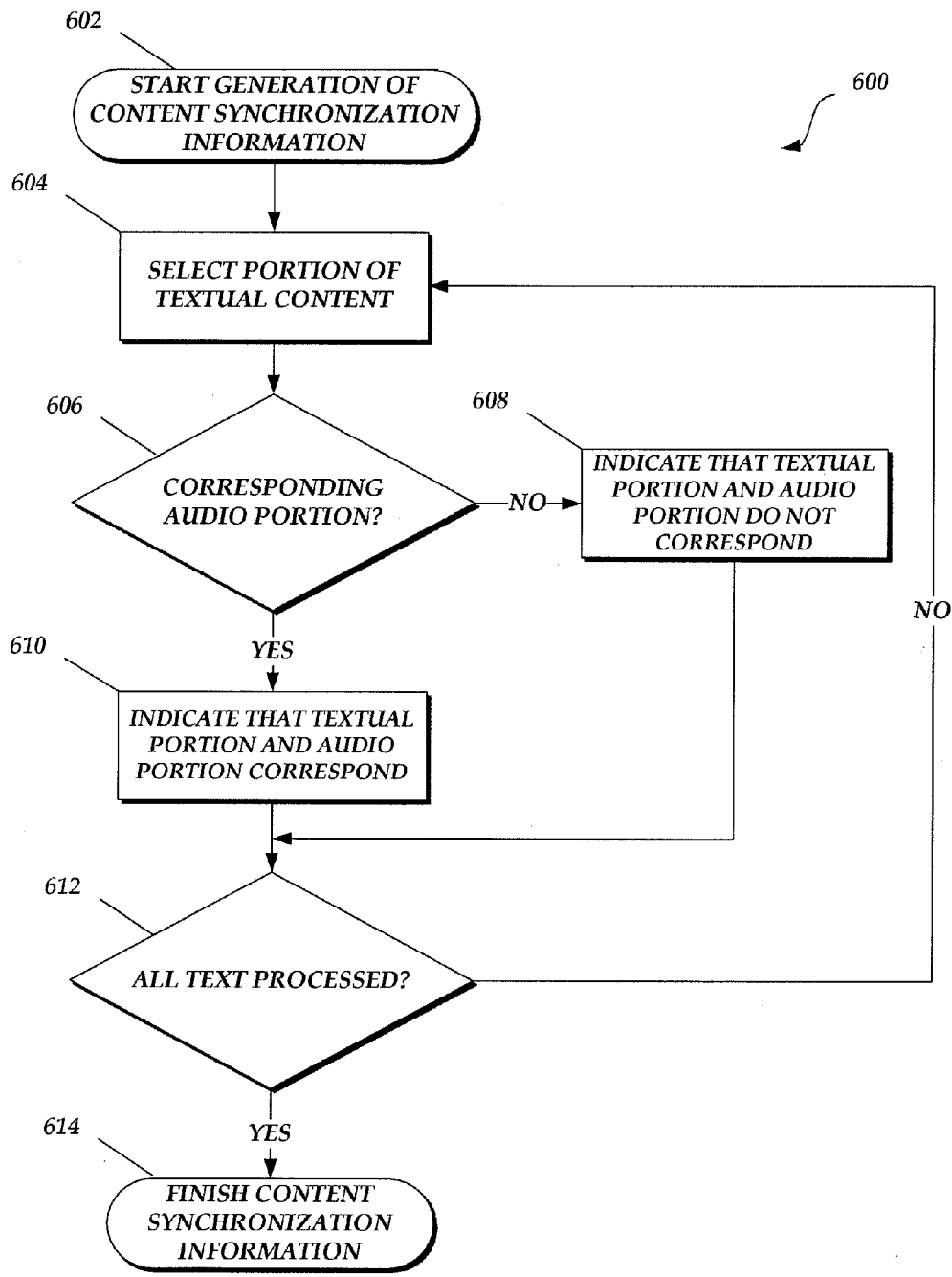
FIG. 6 is a flow diagram depicting an illustrative routine for generating synchronization information for companion items of audio content and textual content.

Content synchronization reflecting these corresponding portions may be generated. Turning now to FIG. 6, an illustrative routine 600 for generating content synchronization information from the alignments generated in FIG. 3A, FIG. 3B, FIG. 4A and FIG. 4B is shown. As discussed above, content synchronization information may be generated based on corresponding words between a transcription (or updated textual transcription) of an item of audio content and a companion item of textual content. Generally described, content synchronization information directs a computing device to present corresponding portions of the companion items of content synchronously, and to cease synchronous presentation for mismatched portions of the companion items of content. This content synchronization information may accordingly facilitate the synchronous presentation of a portion of the item of audio content and a corresponding portion of the item of textual content.

In one example of how content synchronization information facilitates the synchronous presentation of companion items of audio content and textual content, the audio content may follow a user's progress in the textual content, so that the words spoken in the audio content line up with the words read by the user in the textual content. The content synchronization information may direct a user computing device 102 to synchronously present a portion of the item of audio content indicated to correspond to a portion of the item of textual content, for example.

The illustrative routine 600 for generating content synchronization information may start in block 602. In block 604, the content alignment service may select a portion of the item of textual content. Generally described, a portion of the textual content is a constituent of a block of textual content, which may be aligned to a block of audio content based on a correlation measure as discussed above with respect to FIG. 3A. A block may include one or more portions, each portion corresponding to a word, phrase, sentence, paragraph, etc.

Portions of textual content may be identified in a block of textual content in a number of ways. Portions corresponding to words, phrases, or sentences, may be identified using techniques such as statistical language models, finite grammars, optical character recognition to identify spaces, and other techniques. In examples pertaining to the English language and many other languages, a word may be bounded by spaces on either side; a phrase may be bounded by punctuation, prepositions, conjunctions, changes in word type (e.g., noun to verb indicating a change from subject to predicate); and sentences may be bounded at the beginning by a capital letter and at the end by a period, exclamation point, question mark, or the like.

Portions corresponding to paragraphs may be identified in several ways. In one embodiment, optical character recognition techniques are used to identify paragraph boundaries. For example, in many languages, words within the same paragraph typically proceed horizontally from left-to-right and down the page at the end of each line until the last word in the paragraph is reached. Once the last word in the paragraph has been reached, the first word of the next paragraph may appear on the next line, rather than in the same line as the last word in the previous paragraph. Accordingly, paragraph boundaries may be identified by locating breaks in the typical horizontal progression of words in a paragraph. In other embodiments, metadata (such as embedded markup language) or characters indicating paragraph boundaries (such as pilcrows, carriage returns, ASCII or Unicode hard returns, paragraph numbers, and the like) are used to identify paragraph boundaries.

It will be appreciated that the techniques for identifying portions discussed herein may be flexibly adapted for use with other languages based on how text progresses in a particular language. In one example for identifying sentences in Spanish-language text, the beginning of a sentence corresponding to a question may begin with an inverted question mark and end with an upright question mark. The upright and inverted question marks may thus bound a portion corresponding to a sentence. Additionally, in many East Asian languages (e.g., Chinese, Japanese, and Korean) text may be read right-to-left and/or top-to-bottom, while in the Arabic and Hebrew languages, text may be read right-to-left and down the page at the end of each line, and thus the spacing techniques for identifying paragraphs discussed above may be adapted accordingly. Additionally, input from a human interaction task system may be obtained to identify portions corresponding to words, phrases, paragraphs, etc.

As discussed above, blocks of the audio content may be aligned with blocks of the textual content. Based on these block alignments, portions of the audio content may be aligned to portions of the textual content. An example will prove illustrative. A block of audio content may last ten minutes. Timestamps may be assigned to the words of the block of textual content as discussed above with respect to FIG. 3A. Accordingly, timestamps may be assigned to portions of the textual content comprising one or more words. A block of textual content including three paragraphs may have been aligned to a block of audio content that spans ten minutes. Based on the timestamps assigned to the words of the block of textual content, the content alignment service may determine that a first paragraph of the textual content should be compared to the portion of the audio content spanning the time interval from 0:00-0:02 (minutes); a second paragraph of the textual content should be compared to the portion of the audio content spanning 0:02-0:06 (minutes); and a third paragraph of the textual content should be compared to the portion of the audio content spanning interval from 0:06-0:10 (minutes).

In block 606, the content alignment service may determine whether the portion of the item of audio content and the portion of the item of textual content correspond. In some embodiments, these portions correspond if the portion of the textual content has at least a threshold percentage of words that correspond to words included in a portion of the audio content to which it is compared, as might be determined by comparing the timestamped portion of the textual content with a timestamped transcription of the portion of the audio content. This threshold percentage may be 50% corresponding words; 70% corresponding words; 95% corresponding words; or any other threshold percentage.

Returning to the above example, to determine whether the first paragraph of the block of textual content corresponds to a portion of the audio content, the content alignment service may compare the timestamped words of the textual content corresponding to the time interval from 0:00-0:02 (minutes) to the timestamped words of the transcription corresponding to the same time interval. If at least a threshold percentage of the words in the paragraph correspond to words in the transcription, the portion of the textual content and the portion of the audio content from which the transcription portion was generated may be identified as corresponding portions, as shown in block 610. If not, the portions may be identified as non-corresponding mismatches, as shown in block 608.

In other embodiments, a portion score may be used to determine whether a the portion of audio content and the portion of textual content correspond. The portion score between the portion of audio content and the portion of textual content may be computed by comparing the timestamped portion of the textual content with a timestamped transcription of the portion of the audio content, and identifying any corresponding words. Scores may be assigned to each individual corresponding word, substantially as discussed above with respect to FIG. 4A. If the portion score for a portion of textual content and a portion of a transcription of the audio content satisfies a threshold, the portion of the textual content may be determined to correspond to the portion of the audio content from which the transcription portion was generated.

If the portions do not correspond, the content alignment service may proceed to block 608 and indicate in the content synchronization information being generated that the textual content does not correspond to the audio content. Accordingly, in some embodiments, while the mismatched portion of the item of textual content is presented on a user computing device 102 provided with the content synchronization information, no audio content is presented by the user computing device 102. The content alignment service may then proceed directly to block 612.

If the portion of the item of textual content does correspond to a portion of the item of audio content, the content alignment service may proceed to block 610 and indicate in the content synchronization information being generated the portions correspond. Accordingly, in some embodiments, while the portion of the item of textual content is presented on a user computing device 102 provided with the content synchronization information, audio content that corresponds to the textual content is synchronously presented by the user computing device 102. The content alignment service may then proceed to block 612.

In block 612, the content alignment service may determine whether all portions of textual content have been processed for purposes of generating content synchronization information. If not, the content alignment service returns to block 604. On the other hand, if all portions of textual content have been processed, the content synchronization information generation routine 600 finishes in block 614.

Accordingly, the generated content synchronization information may include information indicating whether one, some, or all portions of the item of textual content correspond to a portion of the audio content. This generated content synchronization information may be used to facilitate the synchronous presentation of matching portions of audio content and textual content. Corresponding portions may be presented synchronously, while synchronous presentation may be disabled for mismatching portions.

As the illustrative routine 600 identifies corresponding portions and non-corresponding portions, the illustrative routine 600 may also determine a presentation position in each companion item of content for each corresponding portion and non-corresponding portion of the companion items of audio and textual content. The presentation position in each companion item of content may be measured by word position, time position, or other metrics, as discussed further herein with respect to FIG. 7 and FIG. 8.

Based on the presentation positions of the corresponding portions and non-corresponding portions of the companion items of content, it will be recognized that the illustrative routine 600 can be used to identify front matter and back matter in an item of textual content. For example, all portions or blocks of the textual content that occur prior to the first portion of textual content for which a corresponding portion of audio content is indicated (e.g., whose presentation position in the item of textual content is prior to the first corresponding portion of textual content) may be deemed front matter. Front matter may include tables of contents, forewords, epigraphs, prologues, commentary, dedications, copyright notices, Library of Congress information or other bibliographical information, etc. that are not narrated in the audio content. Likewise, all portions or blocks of the textual content that fall after the last portion of textual content for which a corresponding portion of audio content is indicated may be deemed back matter, which may include appendices, indices, afterwords, glossaries, concordances, commentary, epilogues, etc. that are not narrated in the audio content.

Figure 7:
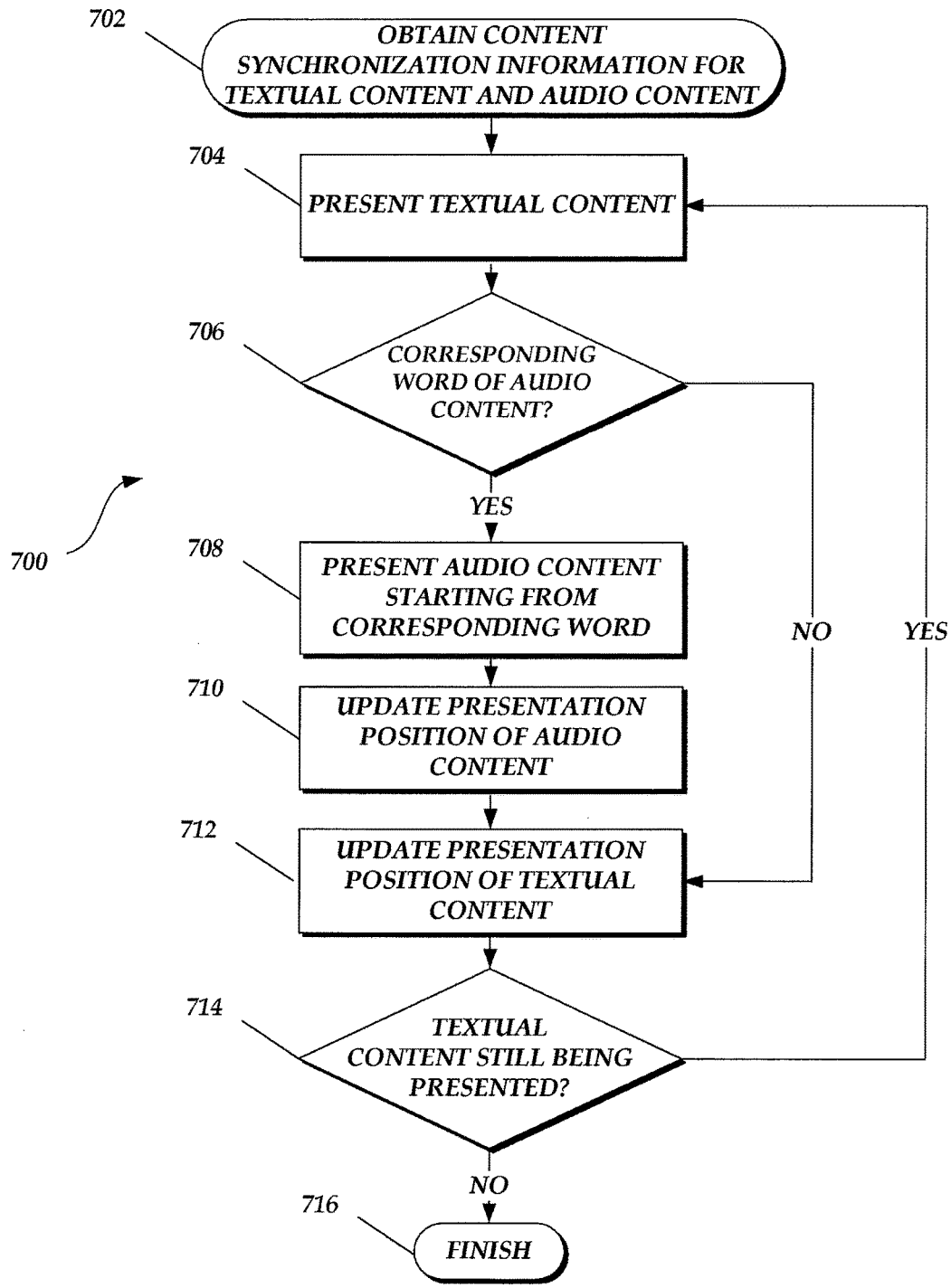
FIG. 7 is a flow diagram depicting an illustrative routine for synchronously presenting companion items of content using the content synchronization information generated in FIG. 6.

As discussed above, the content synchronization information generated during the illustrative routine 600 may be used to facilitate the synchronous presentation of companion items of audio content and textual content. Turning to FIG. 7, a flow diagram of an illustrative routine 700 for synchronously presenting companion content using content synchronization information is depicted.

At block 702, a computing device such as the user computing device 102 can obtain content synchronization information corresponding to the companion textual content and audio content. The content synchronization information may be obtained, for example, from a content alignment server 110 configured to generate content synchronization information. Alternatively or additionally, the content synchronization information may be obtained by a user computing device 102 configured to generate content synchronization information. An illustrative routine 600 for generating content synchronization information is described above with respect to FIG. 6.

As previously described, the content synchronization information can include information regarding positions in the item of textual content that correspond to positions in the item of content comprising audio content (e.g., a page and line in an electronic book and a playback position of an audiobook), additional information related to synchronous presentation (e.g., information for highlighting, underlining, etc. a portion of an electronic book that corresponds to the playback of an audiobook), information identifying portions of the textual content and audio content that correspond or fail to correspond, or any combination thereof.

The presentation positions of the textual content and the audio content may be measured by any of a variety of metrics, specific, non-limiting examples of which are shown in FIG. 8. For example, presentation position may be measured on a time basis and/or word-by-word basis, based on timestamps assigned to the words of the textual content and/or the portion of the transcription, as shown in timestamp table 810 and word table 820. In another embodiment, presentation position is measured on a character-by-character basis, as shown in character table 830. In yet another embodiment, presentation position is measured on a syllable-by-syllable basis, as shown in syllable table 840. Still other metrics for measuring presentation positions are possible.

Returning to FIG. 7, in block 704, the textual content may be presented. It should be appreciated that textual content may be presented in several ways, including visually (e.g., as text on a screen) or tactilely (e.g., via mechanical vibrations and/or by presenting Braille), or a combination thereof. As discussed above, the item of textual content may be any electronic item of content that includes text, such as electronic books, periodicals, scripts, librettos, and the like, or blocks or portions thereof. The presentation in block 704 may start from any word in the item of textual content.

In block 706, the illustrative routine 700 may determine whether the word of the textual content from which the presentation in block 704 started is synchronized to a word of the audio content. Specifically, the illustrative routine 700 may determine whether the word from which the presentation started in block 704 belongs to a portion of the item of textual content that corresponds to a portion of audio content. If not, the presentation position of the item of textual content may be updated in block 712 as the textual content is presented, without synchronous presentation of audio content.

If the word from which the presentation started in block 704 does belong to a portion of the item of textual content that corresponds to a portion of audio content, the corresponding portion of audio content may be presented starting from the synchronized word in block 708. In some embodiments, the audio content is presented synchronously with the textual content, for example, by generating audible output through speakers or headphones that may be in communication with a user computing device 102. As the audio content is presented, its presentation position (as might be measured by a timestamp or other metric as discussed above with respect to FIG. 8) may be updated in block 710. The presentation position of the textual content may be updated as well in block 712. In a specific example, this may include turning the page of an electronic book in block 710 when the playback of an audiobook has advanced in block 712 beyond the text associated with a page being displayed or to the end of the text associated with the page being displayed. In some embodiments, the presentation position of the audio content is continually updated based on the content synchronization information and the presentation position of the textual content, for example, as previously described.

In block 714, the illustrative routine 700 may determine whether the textual content is still being presented. If so, the illustrative routine 700 may return to block 704 and present the textual content from the updated position determined in block 712. The illustrative routine 700 may then determine in block 706 whether audio content corresponds to the textual content at the updated position is present, and so forth. If the textual content is no longer being presented (e.g., a user of the user computing device 102 may have turned the user computing device 102 off, or may have closed an application used to present content), then the illustrative routine may finish at block 716.

Figure 9B:
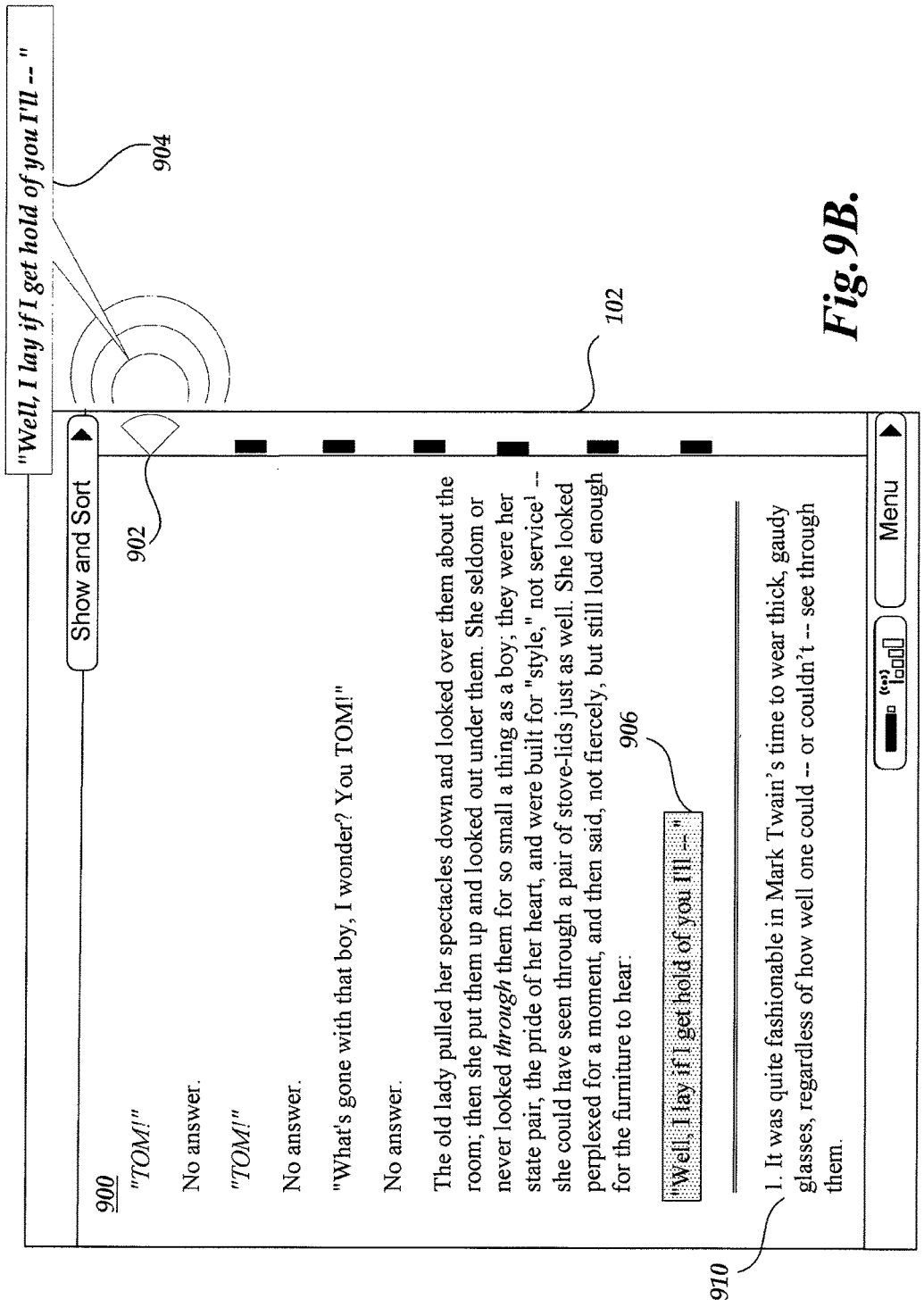
Figure 9C:
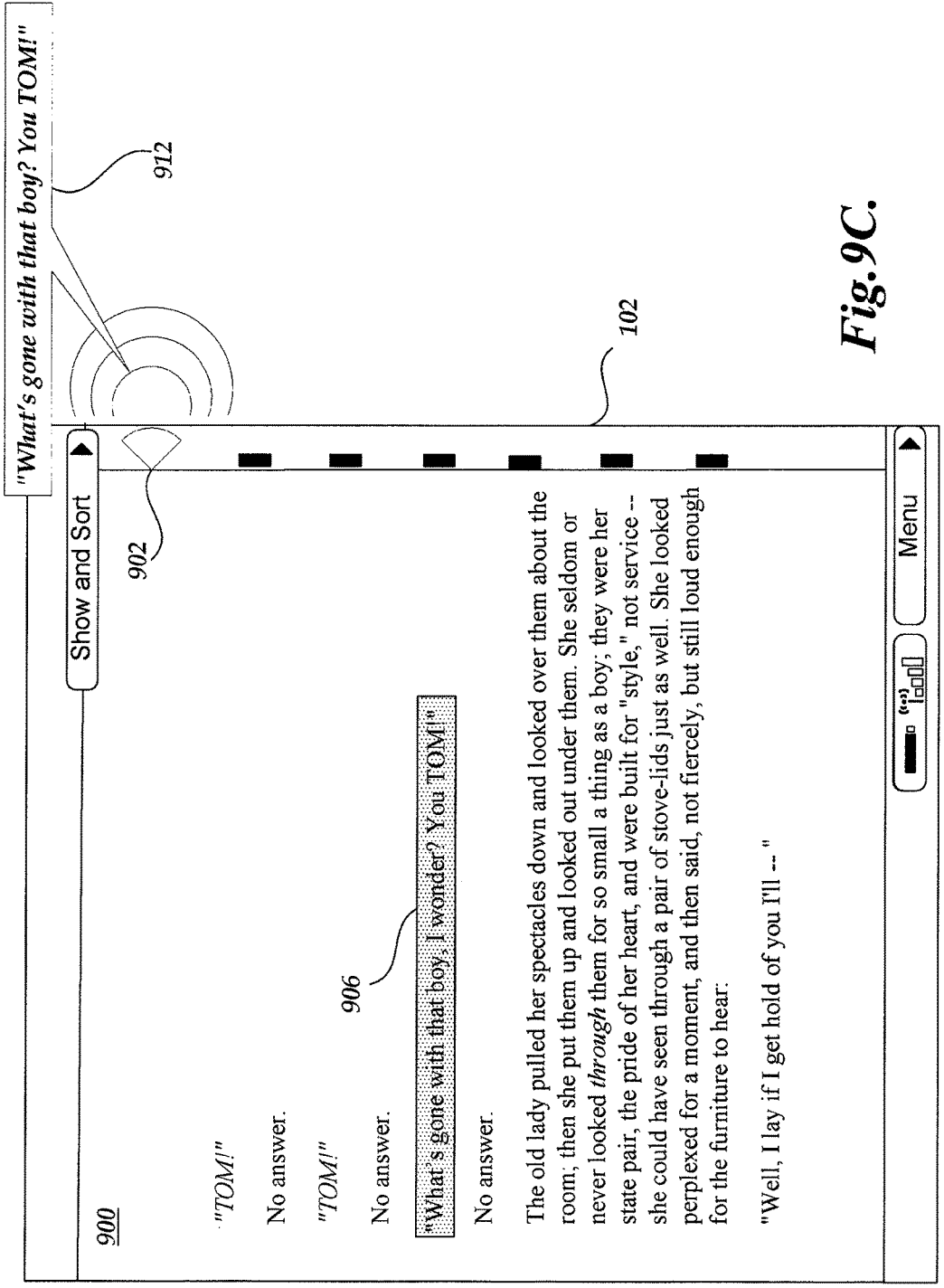

Turning to FIG. 9A, FIG. 9B, and FIG. 9C, examples of a user computing device 102 synchronously presenting companion content, such as an electronic book and a corresponding audiobook, are illustrated. As illustrated in FIG.

9A, FIG. 9B, and FIG. 9C, in which identical reference numbers refer to similar or identical elements, the user computing device 102 can visually present text of the electronic book on a display 900. The user computing device 102 can also aurally present the companion audiobook simultaneously via one or more speakers 902 and/or one or more audio outputs, which may be provided to speakers or headphones. Content synchronization information may be used to synchronously present and update the presentation position of both the audiobook content and the visual electronic book content. This may include, for example, any combination of features described in reference to the illustrative routine 700 depicted in FIG. 7.

In addition, the user computing device 102 may also present an indicator 906, which can indicate a presentation position of the audiobook content in relation to the visual presentation of the electronic book content within the visual presentation of the electronic book. For example, the text of the electronic book presented using the display 900 can be enhanced to indicate the playback position of the audiobook presented via the speaker 902. In this regard, text can be highlighted, underlined, and/or presented in different font (e.g., using different color, size, type, effect, etc.). Individual words, lines, sentences, and/or other units of text can be enhanced to indicate an audio playback position. When the playback of the audiobook reaches the end of a page of the electronic book being presented, the next page of the electronic book can be displayed automatically using the content synchronization information.

In some embodiments, a user can select any word or group of words of a page of an electronic book presented on the display 900 and start playback at a corresponding point in the audiobook. Alternatively or additionally, the user can navigate to any point in time in the audiobook, and the corresponding page of the electronic book can be displayed by the user computing device 102, and/or the user can navigate to any position in the electronic book and playback of the audiobook can begin at the corresponding point in the audiobook.

The user computing device 102 can also support search and bookmarking functionalities, maintaining the synchronous presentation of both the audiobook and the electronic book. The user computing device 102 can monitor both audio and textual presentation positions, so a user can switch between textual display and audio playback, and resume consumption of the other form of content from the last position.

Turning specifically to FIG. 9A, the textual content being presented may include front matter 908. As discussed above, front matter is infrequently narrated in audio content and thus, would be identified by the techniques discussed above, as an uncertain region. Accordingly, a portion mismatch for the front matter 908 may be indicated in the content synchronization information (e.g., the front matter 908 may not correspond to any portion of the audio content). Thus, the audio content 904 may be presented starting from a presentation position corresponding to the first word of the textual content that belongs to a portion of textual content indicated to correspond to a portion of audio content. Here, for example, the words of the front matter 908, "The Adventures of Tom Sawyer: Chapter 1" are unlikely to be narrated in the audio content 904. However, the first word of the textual content belongs to a portion of textual content that corresponds to a portion of the audio content 904: "TOM!" Accordingly, the portion "TOM!" may be marked by indicator 906 as the synchronized audio content 904 is presented.

Turning specifically to FIG. 9B, the textual content being presented may include a footnote 910. It may be likely that no portion of the audio content corresponds to the footnote 910—for example, the footnote may have been identified as an uncertain or mismatching region in the item of textual content, even after processing the footnote according to the uncertain region routine 400. Accordingly, a portion mismatch for the footnote 910 may be indicated in the content synchronization information. Thus, as the audio 904 is presented synchronously with the textual content as shown by indicator 906, an automatic page turn to the next page of the textual content may occur as the last word of the corresponding portion of audio content 904 is presented. In this way, synchronous presentation may be maintained, such that the next portion of the audio content is not presented while a mismatching footnote 910 is presented, for example. Alternately, presentation of the audio content may stop after the last corresponding portion of the audio content on the page is presented, and resume when a portion of the textual content that corresponds to a portion of the audio content is presented (e.g., after the user turns to a page in which a corresponding portion of textual content is present).

Turning specifically to FIG. 9C, it should be noted that the synchronously presented audio content 912 need not be an exact match to the textual content marked by indicator 906. As discussed above, a portion of audio content may be deemed to correspond to a portion of textual content if at least a threshold percentage of corresponding words are present in the portion of the audio content and the portion of the textual content. A corresponding score threshold may also be set as desired. For example, the words "What's gone with that boy" may be sequentially highlighted by the indicator 906 as the words "What's gone with that boy" are presented in the audio content 912. Since the words "I wonder?" in the textual content are not present in the audio content 912, the indicator 906 may jump immediately to the words "You TOM!" Any intervening words may also optionally be highlighted or otherwise indicated by indicator 906.

Items of companion content may be acquired and stored on the user computing device 102 in a variety of ways, such as by purchasing, streaming, borrowing, checking out, renting, permanently leasing, temporarily leasing, or otherwise obtaining temporary or permanent access to items of companion content. In one specific example, a user may have purchased both an electronic book and an audiobook from a network-based retail content provider. In another specific example, the user may check out an audiobook and synchronously present the audiobook with an electronic book that the user has purchased. In another specific example, the user may lease an audiobook and synchronously present the audiobook with a borrowed electronic book.

While the disclosure herein discusses examples of synchronously presenting content for illustrative purposes, the principles and advantages described herein may be applied to other ways of synchronizing content. Any combination of features described herein may be applied to other forms of content synchronization, as appropriate. For example, content synchronization information can be used to switch back and forth between presenting audio content and textual content. More specifically, in some embodiments, a computing device can display the text of an electronic book and then switch to playing the audio of an audiobook at a corresponding position using the content synchronization information. As another example, the principles and advantages described herein can be used to synchronize companion content on different computing devices outside the context of synchronously presenting companion content. For instance, any combination of features described herein can be applied to any of the examples of synchronizing content on different computing devices described in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." These applications were previously incorporated by reference in their entireties above.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y, and at least one of Z to each be present.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for aligning content, the system comprising:
an electronic data store configured to store:
an electronic book comprising:
a plurality of paragraphs of body text, and
matter other than body text, wherein the matter other than body text comprises text within at least front matter and back matter; and
an audiobook that is a companion to the electronic book; and
a physical computing device in communication with the electronic data store, the physical computing device configured to:
generate a textual transcription of the audiobook by applying a speech-to-text recognition routine on the audiobook;
identify a portion of the textual transcription that includes text also included in a paragraph of the electronic book;
determine a level of correlation between words in the paragraph of the electronic book and words in the portion of the textual transcription;
determine that the level of correlation satisfies a threshold value;
in response to determining that the level of correlation satisfies the threshold value, identify the paragraph of the electronic book as body text;
identify a first portion of the electronic book that does not satisfy the threshold value with respect to the textual transcription;
determine that the first portion of the electronic book that does not satisfy the threshold value is front matter based at least in part on a determination that the first portion of the electronic book that does not satisfy the threshold value appears within the electronic book prior to an earliest portion of the electronic book for which a corresponding portion of the audiobook is identified;
identify a second portion of the electronic book that does not satisfy the threshold value with respect to the textual transcription;
determine that the second portion of the electronic book that does not satisfy the threshold value is back matter based at least in part on a determination that the second portion of the electronic book that does not satisfy the threshold value appears within the electronic book after a last portion of the electronic book for which a corresponding portion of the audiobook is identified; and
generate content synchronization information that identifies (a) portions of the audiobook that correspond to the paragraphs of the body text and (b) further identifies the matter other than body text in the electronic book, wherein the content synchronization information indicates that the matter other than body text in the electronic book, including the first portion and second portion of the electronic book, does not correspond to any portion of the audiobook,
wherein the content synchronization information indicates that the paragraph, excluding the matter other than body text, should be presented in synchronization with a portion of the audiobook from which the corresponding portion of the textual transcription was generated.

2. The system of claim 1, wherein the physical computing device is further configured to provide the content synchronization information to a separate computing device.

3. The system of claim 1, wherein the physical computing device is further configured to synchronously present the paragraph of the electronic book and the portion of the audiobook from which the corresponding portion of the textual transcription was generated.

4. A computer-implemented method for aligning content, the computer-implemented method comprising:
as implemented by one or more computing devices configured with specific computer-executable instructions, obtaining a textual transcription of an item of content comprising audio content;

identifying a portion of the textual transcription that includes text also included in a portion of a companion item of textual content, wherein the textual content includes body text and matter other than body text;

determining a level of correlation between words in the portion of the companion item of textual content and words in the portion of the textual transcription;

determining that the level of correlation satisfies a threshold value;

in response to determining that the level of correlation satisfies a threshold value, identifying the portion of the companion item of textual content as including body text;

identifying a second portion of the companion item of textual content that does not satisfy the threshold value with respect to any portion of the textual transcription;

determining that the second portion of the companion item of textual content that does not satisfy the threshold value is front matter based at least in part on a determination that the second portion of the companion item of textual content that does not satisfy the threshold value appears within the companion item of textual content prior to an earliest portion of the companion item of textual content for which a corresponding portion of the audio content is identified; and generating content synchronization information that indicates (a) portions of the audio content that correspond to body text of the companion item of textual content and (b) further indicates that the matter other than body text in the textual content does not correspond to any portion of the audio content, wherein the matter other than body text includes the second portion of the companion item of textual content determined to be front matter, wherein the content synchronization information indicates that the body text included in the portion of the companion item of textual content should be presented in synchronization with a portion of the audio content that corresponds to the body text included in the portion of the textual transcription.

5. The computer-implemented method of claim 4, wherein obtaining the textual transcription comprises generating the textual transcription from the audio content.

6. The computer-implemented method of claim 4, wherein determining the level of correlation between words in the portion of the companion item of textual content and words in the portion of the textual transcription comprises computing a correlation measure for a block of the companion item of textual content with respect to the textual transcription, the block comprising one or more portions of the companion item of textual content.

7. The computer-implemented method of claim 4, wherein the body text portion comprises at least one of a word, a phrase, a sentence, a paragraph, and a line of dialogue.

8. The computer-implemented method of claim 4, wherein the companion item of textual content is an electronic book.

9. The computer-implemented method of claim 4, wherein the item of content comprising audio content is an audiobook.

10. The computer-implemented method of claim 4, wherein the item of content comprising audio content further comprises video content.

11. A system for aligning content, the system comprising:
an electronic data store configured to store:
a transcription of an item of content comprising audio content; and
a companion item of textual content, wherein the companion item of textual content comprises:
a plurality of paragraphs of body text, and
matter other than body text; and
a physical computing device in communication with the electronic data store, the physical computing device configured to:
identify, in the transcription, a portion of the transcription that includes text also included in a portion of the companion item of textual content;
determine a level of correlation between words in the portion of the companion item of textual content and words in the portion of the transcription;
determine that the level of correlation satisfies a threshold value;
in response to determining that the level of correlation satisfies a threshold value, identify the portion of the companion item of content as body text;
identify a second portion of the companion item of textual content that does not satisfy the threshold value with respect to any portion of the transcription;
determine that the second portion of the companion item of textual content that does not satisfy the threshold value is back matter based at least in part on a determination that the second portion of the companion item of textual content that does not satisfy the threshold value appears within the companion item of textual content after a last portion of the companion item of textual content for which a corresponding portion of the transcription is identified; and
generate content synchronization information that identifies (a) portions of the audio content that correspond to body text of the companion item of textual content and (b) further identifies the matter other than body text in the companion item, wherein the content synchronization information indicates that the matter other than body text in the companion item does not correspond to the audio content, wherein the matter other than body text includes the second portion of the companion item of textual content determined to be back matter,
wherein the content synchronization information indicates that the portion of the companion item of textual content, excluding the matter other than body text, should be presented in synchronization with a portion of the audio content that corresponds to the portion of the transcription.

12. The system of claim 11, wherein the level of correlation is determined based at least in part on at least one of metadata associated with the companion item of textual content and metadata associated with the portion of the transcription.

13. The system of claim 11, wherein the level of correlation is determined based at least in part on input received from a human interaction task system.

14. The system of claim 11, wherein the portion of the companion item of content identified as body text comprises at least one of a word, sentence, or paragraph.

15. The system of claim 11, wherein the threshold value comprises a threshold percentage of words in the portion of the transcription corresponding to words in the portion of the companion item of textual content.

16. The system of claim 15, wherein a word in the portion of the transcription corresponds to a word in the portion of the companion item of textual content when the word in the portion of the transcription substantially matches and chronologically corresponds to the word in the portion of the companion item of textual content.

17. The computer-implemented method of claim 4, further comprising determining the level of correlation between words in the portion of the companion item of textual content and words in the portion of the textual transcription from metadata associated with at least one of the companion item of textual content and the portion of the textual transcription.

18. The system of claim 11, wherein the physical computing device is further configured to determine the level of correlation between words in the portion of the companion item of textual content and words in the portion of the transcription by computing a correlation measure for a block of the companion item of textual content with respect to the transcription, the block comprising one or more portions of the companion item of textual content.

19. The system of claim 11, wherein the physical computing device is further configured to synchronously present the portion of the companion item of textual content and the portion of the audio content that corresponds to the portion of the transcription.

20. The computer-implemented method of claim 6, wherein determining that the level of correlation satisfies a threshold value comprises determining that the correlation measure for the block to which a portion of the companion item of textual content belongs, satisfies the threshold value.

21. The system of claim 18, wherein the physical computing device configured to determine that the level of correlation satisfies a threshold value is configured to determine that the correlation measure for the block to which a portion of the companion item of textual content belongs, satisfies the threshold value.

* * * * *